US012549220B2

(12) United States Patent
Braginsky et al.

(10) Patent No.: US 12,549,220 B2
(45) Date of Patent: *Feb. 10, 2026

(54) METHOD AND APPARATUS TO ENABLE COMMUNICATION AND CONTROL IN A POWER SYSTEM

(71) Applicant: Solaredge Technologies Ltd., Herzeliya (IL)

(72) Inventors: David Braginsky, Yokne'am (IL); Yoav Galin, Raanana (IL); Ilan Yoscovich, Givatayim (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/824,188

(22) Filed: Sep. 4, 2024

(65) Prior Publication Data

US 2025/0015835 A1    Jan. 9, 2025

Related U.S. Application Data

(63) Continuation of application No. 17/844,947, filed on Jun. 21, 2022, now Pat. No. 12,126,400, which is a
(Continued)

(51) Int. Cl.
*H04B 3/54* (2006.01)
*H02J 3/38* (2006.01)
(Continued)

(52) U.S. Cl.
CPC ........ *H04B 3/542* (2013.01); *H02J 13/00007* (2020.01); *H04B 3/546* (2013.01);
(Continued)

(58) Field of Classification Search
CPC ............. H02J 3/381; H02J 2300/24–26; H02J 13/0003; H02J 13/00007–00009;
(Continued)

(56) References Cited

U.S. PATENT DOCUMENTS 5,053,583 A     10/1991  Miller et al.
2005/0213874 A1  9/2005  Kline
(Continued)

FOREIGN PATENT DOCUMENTS

CN    103703647 A    4/2014
EP    2725678 A1     4/2014
EP    2960945 A2 *  12/2015  ............... H02H 7/22

OTHER PUBLICATIONS

English machine translation of EP2960945A2 published Dec. 30, 2015 (Year: 2015).*
(Continued)

*Primary Examiner* — Rexford N Barnie
*Assistant Examiner* — David A Shiao
(74) *Attorney, Agent, or Firm* — Banner & Witcoff, Ltd.

(57) ABSTRACT

A network unit may be operatively attached to power lines of an interconnected power system and/or a device such as a power module that may further include a communication interface. The network unit may be operable to superimpose a first signal representative of a sensed parameter of the power system onto the power lines, thereby to transmit the first signal to other power modules in the interconnected power system or to a power device in interconnected power system. The network unit may receive a second signal of the parameter superimposed onto the power lines from another network unit.

20 Claims, 14 Drawing Sheets

Related U.S. Application Data continuation of application No. 15/983,382, filed on May 18, 2018, now Pat. No. 11,398,749.

(60) Provisional application No. 62/509,411, filed on May 22, 2017.

(51) Int. Cl.
  *H02J 13/00* (2006.01)
  *H04B 3/56* (2006.01)
  *H02S 50/00* (2014.01)

(52) U.S. Cl.
  CPC ............. *H04B 3/548* (2013.01); *H04B 3/56* (2013.01); *H02J 3/381* (2013.01); *H02J 13/00017* (2020.01); *H02J 2300/24* (2020.01); *H02S 50/00* (2013.01); *H04B 2203/5458* (2013.01); *H04B 2203/547* (2013.01)

(58) Field of Classification Search
  CPC .......... H02S 40/30–38; H04B 3/54–58; H04B 2203/54–5495
  See application file for complete search history.

(56) References Cited

U.S. PATENT DOCUMENTS

| | | |
|---|---|---|
| 2006/0171329 A1 | 8/2006 | Ying |
| 2007/0195823 A1 | 8/2007 | Biegert |
| 2009/0184835 A1 | 7/2009 | Deaver, Sr. et al. |
| 2010/0082171 A1 | 4/2010 | Takehara et al. |
| 2010/0117858 A1 | 5/2010 | Rozenboim |
| 2011/0031814 A1 | 2/2011 | Giesler |
| 2011/0121652 A1 | 5/2011 | Sella et al. |
| 2012/0050924 A1* | 3/2012 | Matsuo ............... H10F 77/955 361/42 |
| 2012/0175961 A1* | 7/2012 | Har-Shai ............... H02H 7/20 307/80 |
| 2012/0267952 A1 | 10/2012 | Ballatine et al. |
| 2013/0009483 A1* | 1/2013 | Kawate .................. H02J 7/35 307/77 |
| 2013/0134782 A1 | 5/2013 | Seon |
| 2013/0194706 A1* | 8/2013 | Har-Shai ............... H02S 40/36 361/42 |
| 2013/0200617 A1 | 8/2013 | Smith et al. |
| 2013/0300208 A1 | 11/2013 | Yu et al. |
| 2013/0334872 A1 | 12/2013 | Kodama et al. |
| 2014/0003110 A1 | 1/2014 | Rothblum et al. |
| 2014/0161201 A1 | 6/2014 | Yukizane et al. |
| 2014/0265551 A1 | 9/2014 | Willis |
| 2014/0306713 A1* | 10/2014 | Ambo ................... G01R 31/52 324/509 |
| 2014/0369098 A1 | 12/2014 | Li |
| 2015/0163074 A1 | 6/2015 | Pruett et al. |
| 2015/0207459 A1 | 7/2015 | Choi et al. |
| 2015/0222227 A1* | 8/2015 | Nishizawa ............. H02S 50/00 324/761.01 |
| 2015/0318583 A1 | 11/2015 | Bacquet |
| 2015/0325919 A1 | 11/2015 | Cobos Reyes et al. |
| 2016/0087679 A1 | 3/2016 | Behrends |
| 2017/0288599 A1* | 10/2017 | Chapman ............... H02J 3/381 |
| 2017/0310272 A1 | 10/2017 | Julian et al. |
| 2018/0177021 A1 | 6/2018 | Roberge et al. |
| 2019/0199282 A1 | 6/2019 | Ochiai et al. |

OTHER PUBLICATIONS

Aug. 23, 2018—European Search Report for EP 18173581.2.
Feb. 11, 2023—CN Office Action—CN App. No. 201810487277.X.
Feb. 21, 2023—EP Office Action—EP App. No. 20189016.7.

* cited by examiner

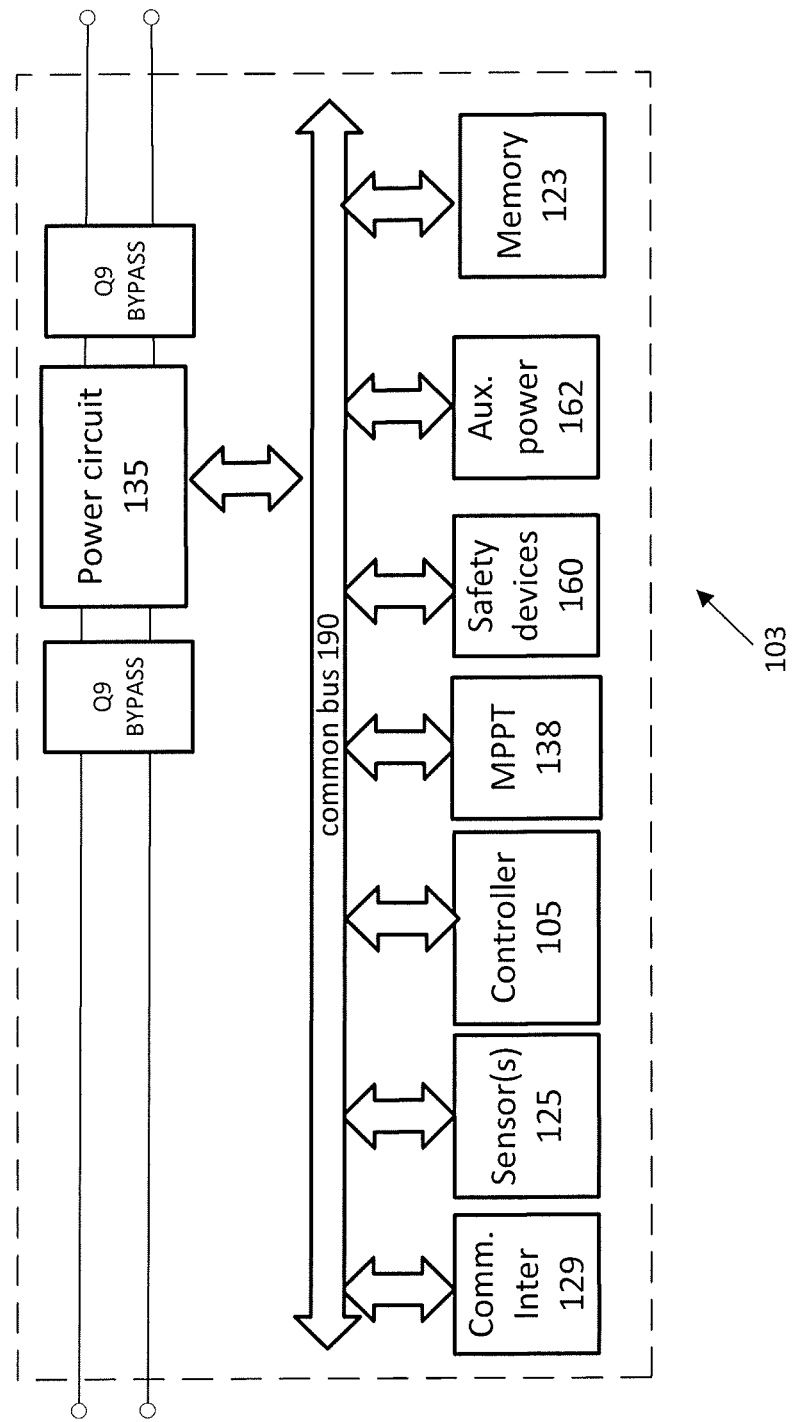

SECTION 2I – 2I

METHOD AND APPARATUS TO ENABLE COMMUNICATION AND CONTROL IN A POWER SYSTEM

RELATED APPLICATIONS

This application is a continuation of U.S. application Ser. No. 17/844,947, filed Jun. 21, 2022, which is a continuation of U.S. application Ser. No. 15/983,382, filed May 18, 2018 (now U.S. Pat. No. 11,398,749), which claims priority to U.S. Provisional Application No. 62/509,411, filed May 22, 2017, entitled "Method and Apparatus to Enable Communication and Control in a Power System." The entire contents of the aforementioned applications are incorporated herein by reference for all purposes.

BACKGROUND

Generally, PLC (Power Line Communication) is a method that transmits a communication signal modulated using a carrier wave on power distribution lines of a power system installed outdoors or indoors. Distribution lines are used to enable the transmission and reception of signals, and the information provided in those signals is used for various purposes related to the power system.

SUMMARY

The following is a short summary of some of the inventive concepts for illustrative purposes only, and is not intended to limit or constrain the inventions and examples in the detailed description. One skilled in the art will recognize other novel combinations and features from the detailed description.

Illustrative embodiments disclosed herein may include a system used to supply power to a load, a storage device and/or one or more direct current (DC) to direct current converters and/or one or more DC to alternating current (AC) converters (e.g., inverters, micro-inverters). The system may include various devices and may implement methods for the devices to enable communication within the system and with other systems. The system may include various interconnections of groups of DC power sources that also may be connected in various series, parallel, series parallel, and/or parallel series combinations, for example.

In some illustrative embodiments disclosed herein, a power line communication (PLC) device may be magnetically coupled to power lines, and the magnetic coupling might not require direct electrical connection to the power lines. As such, the PLC devices may be attached and re-attached at various locations in a power system as part of a possible retrofit of the power system in order to provide monitoring and control of the power system.

In some illustrative embodiments disclosed herein, a PLC device may be integrated as part of an electrical device, such as a string combiner box where safety devices and termination blocks are used to connect power cables of strings of interconnected power sources together as part of a power system. The string combiner box may include additional connections to power modules, controllers and their connections to the safety devices and termination blocks for example. The PLC devices may connect to the power cables and may enable communications between various parts of the power system in order to provide monitoring and control of the various devices within the power system.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

FIG. 1B shows further details of a power module, according to one or more illustrative embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be used and structural and functional modifications may be made, without departing from the scope of the present disclosure.

The term "multiple" as used here in the detailed description indicates the property of having or involving several parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches for example.

Figure 1A:
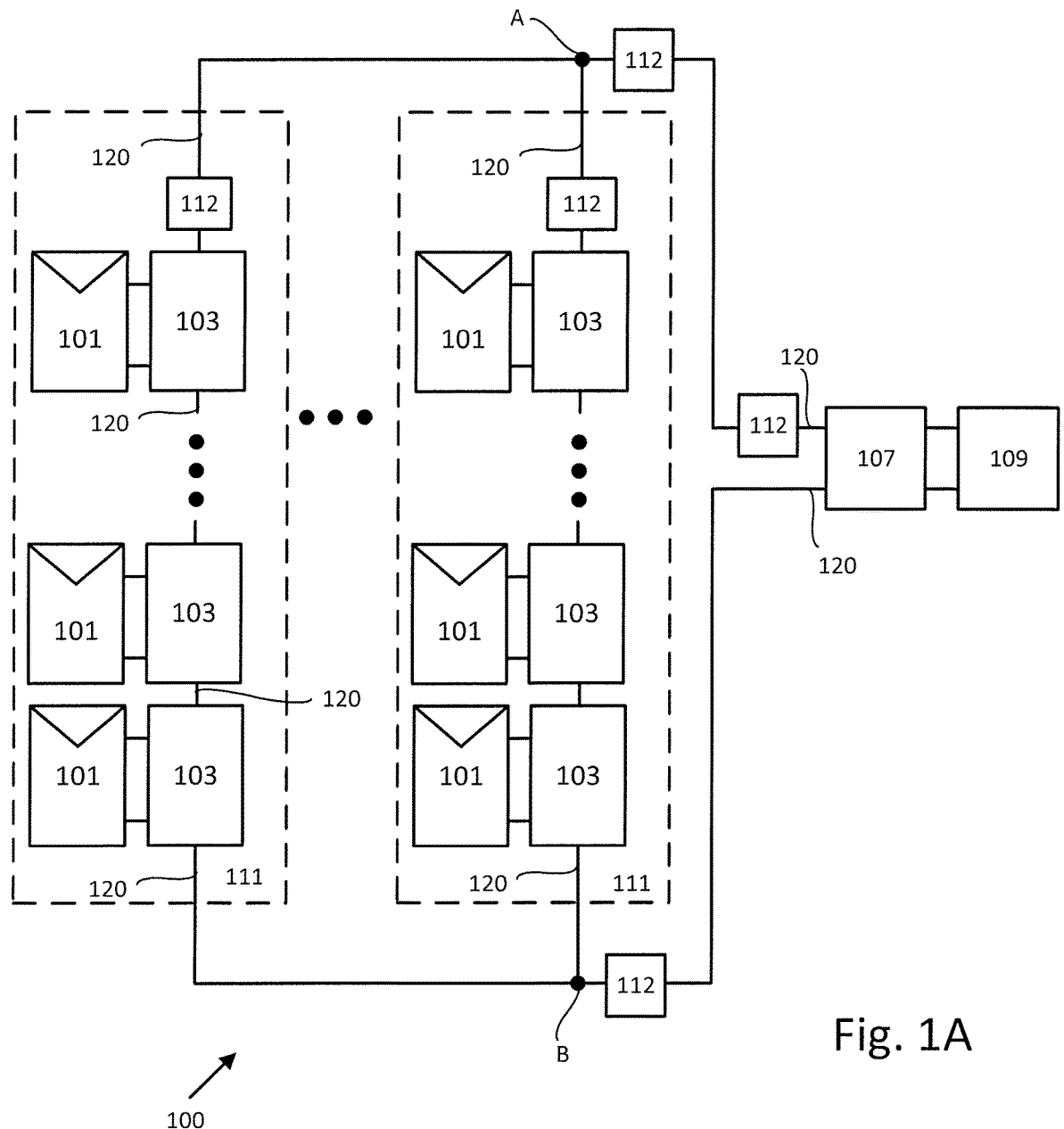
FIG. 1A illustrates a power system, according to one or more illustrative embodiments.

Reference is made to FIG. 1A, which shows a block diagram of a power system 100, according one or more illustrative embodiments. A connection configuration 111 of the power system 100 may include multiple power sources 101 with direct current (DC) output terminals connected to the input terminals of power modules 103. DC output terminals of power modules 103 in connection configuration 111 may be connected in series with power lines 120 to form a series string of power module 103 outputs. Multiple connection configurations 111 may be connected in parallel across the input of power device 107. Power device 107 may include, for example, a direct current (DC) to DC converter, a DC string combiner box, and/or a DC to alternating current (AC) inverter supplying power to load 109. Load 109 may be, for example, a battery, an alternating current (AC) grid or a DC grid, or a DC to AC inverter.

A network unit 112 may be attached to power lines 120 at various locations such as the top of a series string of power module 103 outputs, at connection nodes A and/or B, or at an input to power device 107. In general, any number of network units 112 may be attached to power lines 120 at any number of locations of power system 100. The attachment of network units 112 to power lines 120 may include electrical-mechanical and electromagnetic-mechanical mechanisms. Descriptions below concerning other network units consider include optoelectronic-mechanical mechanisms.

Network unit 112 may be used to enable communication of both transmitted and received signals between power modules 103 and/or between power modules 103 and power devices 107, for example. The signals transmitted and received may include control signals, signals which identify a particular power module 103 and/or power device 107, signals representing a parameter (e.g., voltage, current, power, coulombic charge, level of solar irradiance or temperature) sensed at various locations in power system 100. According to various features described below, network units 112 may also be integrated into power modules 103, power lines 120 and/or power devices 107.

In the descriptions that follow, by way of non-limiting example, power source 101 may be a photovoltaic (PV) generator (for example, a PV cell, a series string of PV cells, a parallel connection of serially connected PV strings of PV cells, a photovoltaic or solar panel), a DC generator, a battery, or a fuel cell. Load 109 may be variously implemented, for example, using a battery, super capacitor, flywheel and/or ULTRABATTERY™ Load 109 may comprise one or more DC load circuits. Power device 107 may comprise communication equipment (e.g., a cellular basestation) or other devices deployed in a location that might not be connected to an electrical grid. Power source 101 may be, for example, a wind turbine that produces alternating current (AC), and power modules 103 may serve as AC-to-DC converters such as rectifiers and/or include use of switched mode power supply, for example.

Reference is now made to FIG. 1B, which illustrates circuitry that may be found in a power device such as power module 103, according to an illustrative embodiment. Power module 103 may be similar to or the same as power device 107 shown in FIG. 1A. In some embodiments, power module 103 may include power circuit 135. Power circuit 135 may include a direct current to direct current (DC/DC) converter such as a Buck, Boost, Buck/Boost, Buck+Boost, Cuk, Flyback, and/or forward converter. In some embodiments, power circuit 135 may include a direct current—alternating current (DC/AC) converter (also known as an inverter), such as a micro-inverter. Power circuit 135 may have two input terminals and two output terminals, which may be the same as the input terminals and output terminals of power module 103. In some embodiments, power circuit 135 might be featured with the two input terminals of power module 103 directly coupled to the two output terminals of power module 103 so that power module 103 functions without power conversion. In some embodiments, power circuit 135 may feature a switch to disconnect the input terminals from the output terminals. In some embodiments, power module 103 may include Maximum Power Point Tracking (MPPT) circuit 138, which is configured to extract increased power from a power source the power device is coupled to. In some embodiments, power circuit 135 may include MPPT functionality. In some embodiments, MPPT circuit 138 may implement impedance matching algorithms to extract increased power from a power source the power device is coupled to. Power module 103 may further include controller 105 such as a microprocessor, Digital Signal Processor (DSP), Application-Specific Integrated Circuit (ASIC), and/or a Field Programmable Gate Array (FPGA).

Referring still to FIG. 1B, controller 105 may control and/or communicate with other elements of power module 103 over common bus 190. In some embodiments, power module 103 may include circuitry and/or sensors/sensor interfaces 125 configured to measure parameters directly or receive measured parameters from connected sensors and/or sensor interfaces configured to measure parameters on or near the power source, such as the voltage and/or current output by the power source and/or the power output by the power source. In some embodiments, the power source may be a photovoltaic (PV) generator comprising PV cells, and a sensor unit (e.g., one or more sensors and/or sensor interfaces) may directly measure or receive measurements of the irradiance received by the PV cells, and/or the temperature on or near the PV generator.

Referring still to FIG. 1B, in some embodiments, power module 103 may include communication interface 129, which is configured to transmit and/or receive data and/or commands from other devices. Communication interface 129 may communicate using Power Line Communication (PLC) technology that enables sending data over existing power cables, or wireless technologies such as ZigBee™, Wi-Fi, cellular communication or other wireless methods. Communication interface 129 may also include a mechanism for opto-electronic communication that includes optical fibers to convey data and/or commands from other devices.

In some embodiments, power module 103 may include memory device 123, for logging measurements taken by sensor(s)/sensor interfaces 125 to store code, operational protocols or other operating information. Memory device 123 may be Flash, Electrically Erasable Programmable Read-Only Memory (EEPROM), Random Access Memory (RAM), Solid State Devices (SSD), or other types of appropriate memory devices.

Referring still to FIG. 1B, in some embodiments, power module 103 may include safety devices 160 (e.g., fuses, circuit breakers and Residual Current Detectors). Safety devices 160 may be passive or active. For example, safety devices 160 may include one or more passive fuses disposed within power module 103 and designed to melt when a certain amount of current flows through it, disconnecting part of power module 103 to avoid damage. In some embodiments, safety devices 160 may include active disconnect switches, which are configured to receive commands from a controller (e.g., controller 105, or an external controller) to disconnect portions of power module 103, or configured to disconnect portions of power module 103 in response to a measurement measured by a sensor (e.g., a measurement measured or obtained by sensors/sensor interfaces 125). In some embodiments, power module 103 may include auxiliary power circuit 162, which is configured to receive power from a power source coupled to power module 103, and output power suitable for operating other circuitry components (e.g., controller 105, communication interface 129, etc.). Communication, electrical coupling and/or data-sharing between the various components of power module 103 may be carried out over common bus 190.

Referring still to FIG. 1B, in some embodiments, power module 103 may include bypass unit Q9 coupled between the inputs of power circuit 135 and/or between the outputs of power circuit 135. Bypass unit Q9 and/or power circuit 135 may be a junction box to terminate power lines 120 or to provide a safety feature such as fuses or residual current devices. Bypass unit Q9 may also be an isolation switch, for example. Bypass units Q9 may be controlled by controller 105. If an unsafe condition is detected, controller 105 may set bypass unit Q9 to ON, short-circuiting the input and/or output of power circuit 135. In a case in which power sources 101 are photovoltaic (PV) generators, each PV generator provides an open-circuit voltage at its output terminals. When bypass unit Q9 is ON, the PV generator connected to module 103 may be short-circuited, to provide a voltage of about zero to power circuit 135. In both scenarios, a safe voltage may be maintained, and the two scenarios may be staggered to alternate between open-circuiting and short-circuiting PV generators. This mode of operation may allow continuous power supply to system control devices, as well as provide backup mechanisms for maintaining a safe voltage (i.e., operation of bypass unit Q9 may allow continued safe operating conditions).

Sensor/sensor interface 125 operatively attached to controller 105 may include analog to digital converters (not shown) that may be connected to sensors. The sensors may be configured to sense electrical parameters such as current, voltage and/or power of load 109, power device 107 and the input and/or output parameters of power circuit 135 and power source 101. Optionally, sensor/sensor interface may also include an energy gauge to count coulombs (amperes per second) when either charging or discharging a battery for example. The sensors may optionally be located and integrated inside power circuit 135 and/or network unit 112 and in other network units described below. The sensors may be optionally spatially located in the vicinity of power device 107 and load 109 respectively. Similarly, a sensor may be spatially located in the vicinity of power source 101. Additional sensors may be added and configured to sense, for example, temperature, humidity and luminance.

Figure 1C:
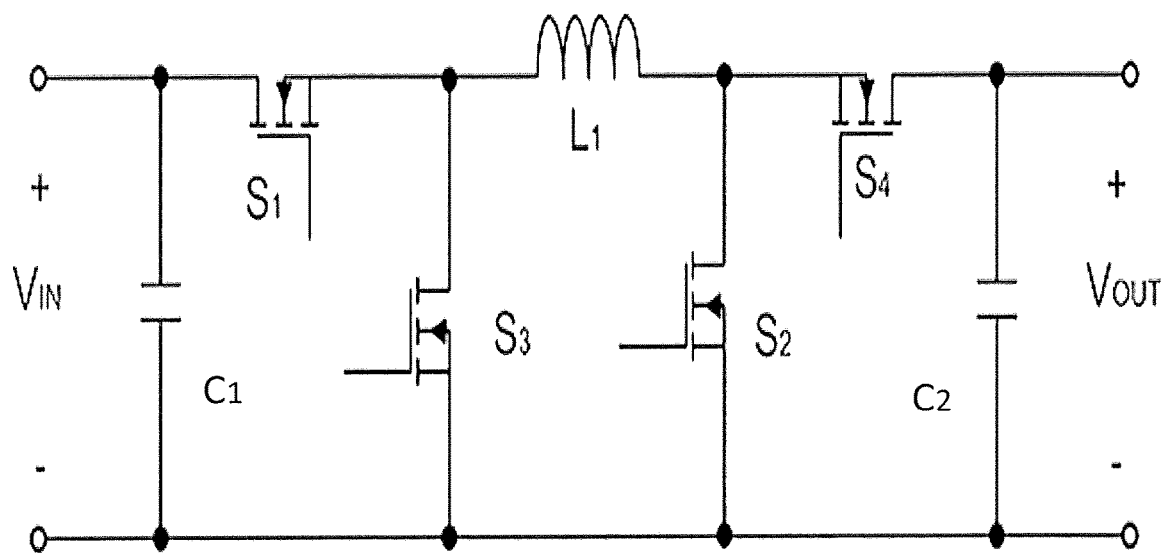
FIG. 1C shows a buck+boost circuit implementation for a power circuit, according to one or more illustrative embodiments.

Reference is made to FIG. 1C, which shows a buck+boost circuit implementation for power circuit 135, according to one or more illustrative embodiments. Capacitor C1 may connect in parallel across the positive and negative input terminals of the buck+boost circuit where the voltage is indicated as VIN. Capacitor C2 may connect in parallel across the positive and negative output terminals of the buck+boost circuit where the voltage is indicated as VOUT. The sources of insulated gate field effect transistors (IG-FETs) S3 and S2 connect to the common negative output and input terminals of the buck+boost circuit. The drain of switch S1 may connect to the positive input terminal, and the source of switch S1 may connect to the drain of switch S3. The drain of switch S4 may connect to the positive output terminal, and the source of switch S4 may connect to the drain of switch S2. Inductor L1 may connect respectively between the drains of switches S3 and S4. The gates of switches S1, S2, S3 and S4 may be operatively connected to controller 105 (see also FIG. 1B).

Switches S1, S2, S3 and S4 may be implemented, for example, using metal oxide semiconductor field effect transistors (MOSFETs), insulated gate bipolar transistors (IG-BTs), bipolar junction transistors (BJTs), Darlington transistor, diode, silicon controlled rectifier (SCR), Diac, Triac or other semi-conductor switches. Similarly, implementation for power circuit 135 may include, for example, a buck circuit, a boost circuit, a buck/boost circuit, a Flyback circuit, a Forward circuit, a charge pump, a Cuk converter or any other circuit that may be used to convert power on the input of power circuit 135 to the output of power circuit 135.

Power circuit 135 may include or be operatively attached to a maximum power point tracking (MPPT) circuit 138. MPPT circuit 138 may also be operatively connected to controller 105 or another controller. MPPT circuit 138 under control of controller 105, or a central controller may be used to increase power extraction from power sources 101 and/or to control voltage and/or current supplied to load 109 and power device 107 in order to avoid damage to load 109 and power device 107. Control of voltage and/or current to load 109 and power device 107, might not necessarily use the feature of increasing power from power sources 101, but rather may use MPPT circuit 138 to operate at a point in order to shed some of the power produced by power sources 101.

In the various aspects described above for power system 100, a communication protocol used by communication interface 129 of FIG. 1B in one primary power module 103 may communicatively control one or more other power modules 103 that are known as secondary power modules 103. Once a primary/secondary relationship is established, a direction of control may be from the primary power module 103 to the secondary power modules 103. When one primary power module 103 experiences a reduction of power input (e.g., due to shading in the case of photovoltaic panels used for power sources 101), and the outputs of power modules 103 are connected in series, the power supply to power the primary module 130 may be taken from the other power module 103 outputs (e.g., by coupling auxiliary power circuit 162 to an output of power circuit 135, which may be coupled to conductors carrying power from other power modules 103. In the case of shading of a panel in a series string including power modules 103 and/or other power modules as described below, a current bypass may be applied to the respective power module 103 and panel.

A communication protocol may be implemented for the direction of control between power modules and/or for transferring data and/or or commands between power modules 103 and power device 107 using, for example power line communication (PLC) techniques over power lines of power system 100 and other power systems as described below. The communication protocol may be implemented using near field communication (NFC), Wi-Fi™ to connect to a wireless local area network (WLAN), BLUETOOTH™, ZIGBEE™ WIMAX™, controller area network (CAN) bus, local interconnect network (LIN), or as described later optical communication protocols such as Fiber Channel (FC), Synchronous Digital Hierarchy (SDH), Synchronous Optical Networking (SONET) or Optical Transport Network (OTN), for example. In some embodiments, communications may be implemented using acoustic communication technology.

Power system 100 may be operably connected to a central controller (not shown), according to one or more illustrative embodiments. The central controller may include a controller 105 coupled to a memory device 123 and a communication interface 129. The central controller 105 may receive power supply in order to operate from power modules 103, from an additional auxiliary power supply or from power device 107. Central controller 105 may receive (e.g., from each power module 103) measured electrical parameters (e.g., current, voltage and/or power of load 109, power device 107 and/or the input and/or output of power circuit 135 and power source 101) sensed by the sensors. In response to the sensed electrical parameters of each power module 103, the central controller may send appropriate control signals to each power module 103 of power system 100. Power modules 103, central controller 105 and in descriptions of other power modules that follow, may derive their power needed to operate on the output side of the power modules, from power device 107 and/or auxiliary power circuits 162. Auxiliary power circuits 162 may similarly derive their power needed to operate from the input side or output side of the power modules or from a power device 107.

Figure 2A:
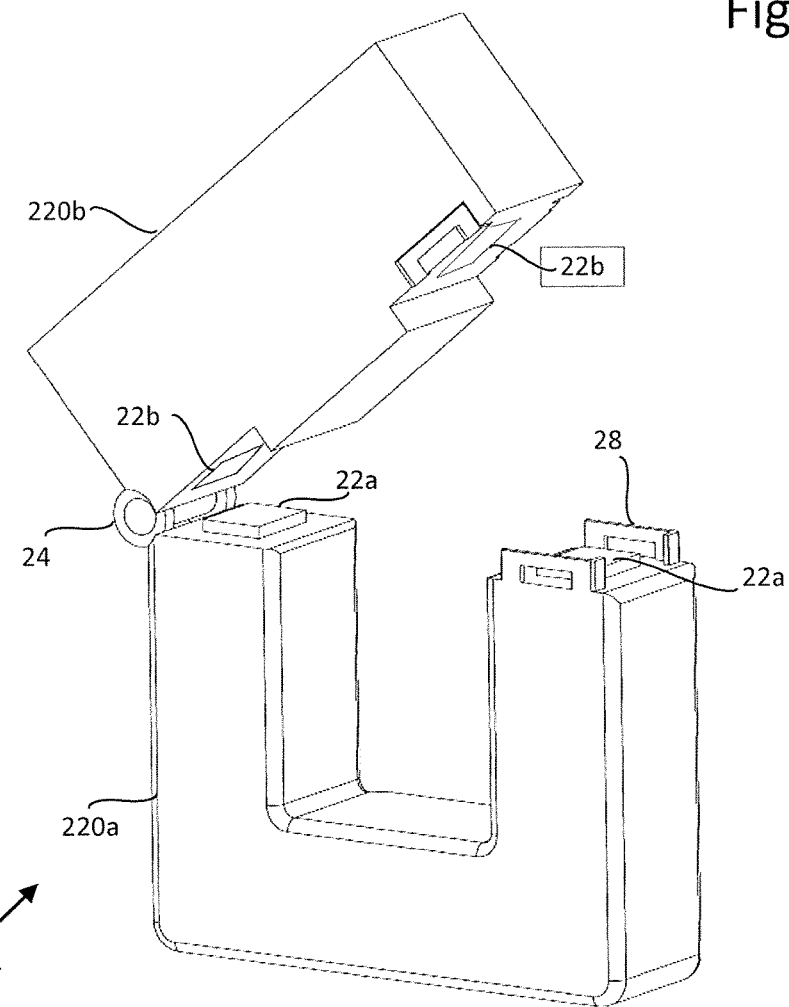
FIG. 2A shows an isometric view of a network unit, according to one or more illustrative embodiments.

Reference is now made to FIG. 2A, which shows an isometric drawing of details of network unit 112, according to one or more illustrative embodiments. Network unit 112 may include an upper housing 220a and a lower housing 220b. Network unit 112 may include a magnetic core that may include upper member 22a and lower member 22b that are respectively housed in upper housing 220a and lower housing 220b. Upper member 22a may be separable from lower member 22b at an opening opposite hinge 24. Hinge is mounted to upper housing 220a and lower housing 220b. Upper member 22a may be magnetically joined to lower member 22b at the opening opposite hinge 24 by use of fastener 28 that may establish a magnetic path in the magnetic core. Alternatively, the magnetic core may be constructed of one piece instead of two pieces such as upper member 22a and lower member 22b and the one piece housed in a single housing. In case the magnetic core is constructed as one monolithic piece, a power line 120 may be passed through the magnetic core without utilizing a hinge.

Figure 2B:
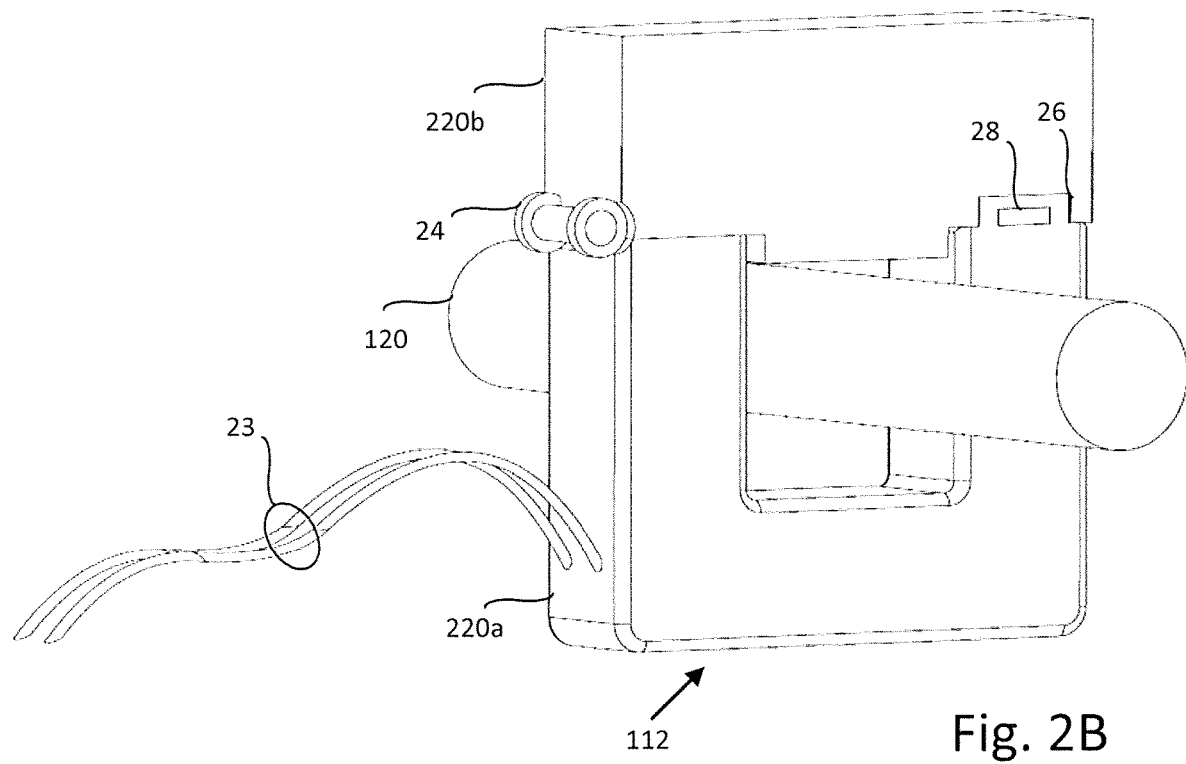
FIG. 2B shows an isometric view of a network unit, according to one or more illustrative embodiments.

Reference is now made to FIG. 2B, which shows another isometric drawing of details of network unit 112, according to one or more illustrative embodiments. Upper housing 220a is shown attached to lower housing 220b. Upper housing 220a may be separable from lower housing 220b at an opening opposite hinge 24, by use of hinge 28. A partial portion of power line 120 is shown inserted through the aperture between upper housing 220a and lower housing 220b. Connection wires 23 may provide power and/or connection to associated transmitter, receiver and/or transceiver circuits (not shown) located in lower housing 220b.

Power to connection wires 23 in the descriptions that follow for the various embodiments of network units described herein may be supplied by a local power source for each network unit 112, to auxiliary power circuit 162, existing DC or AC bus or power in proximity to a network unit 112 that may be converted to DC power. Connection wires 23 may be self-fed by extracting magnetic power from power lines 120. For example, a strong PLC signal may be used to feed the power requirements of network unit 112. Alternatively, where DC plus and minus power lines 120 are available, a direct electrical contact of connection wires may be made to supply the power requirements of network unit 112. Coupling to superimpose and receive signals onto power lines 120 may not be via direct electrical contact to power lines 120. In some embodiments, connection wires might not be used, with power for operating network unit 112 provided by power lines 120 and communication taking place over power lines 120 and/or via wireless communications.

Figure 2C:
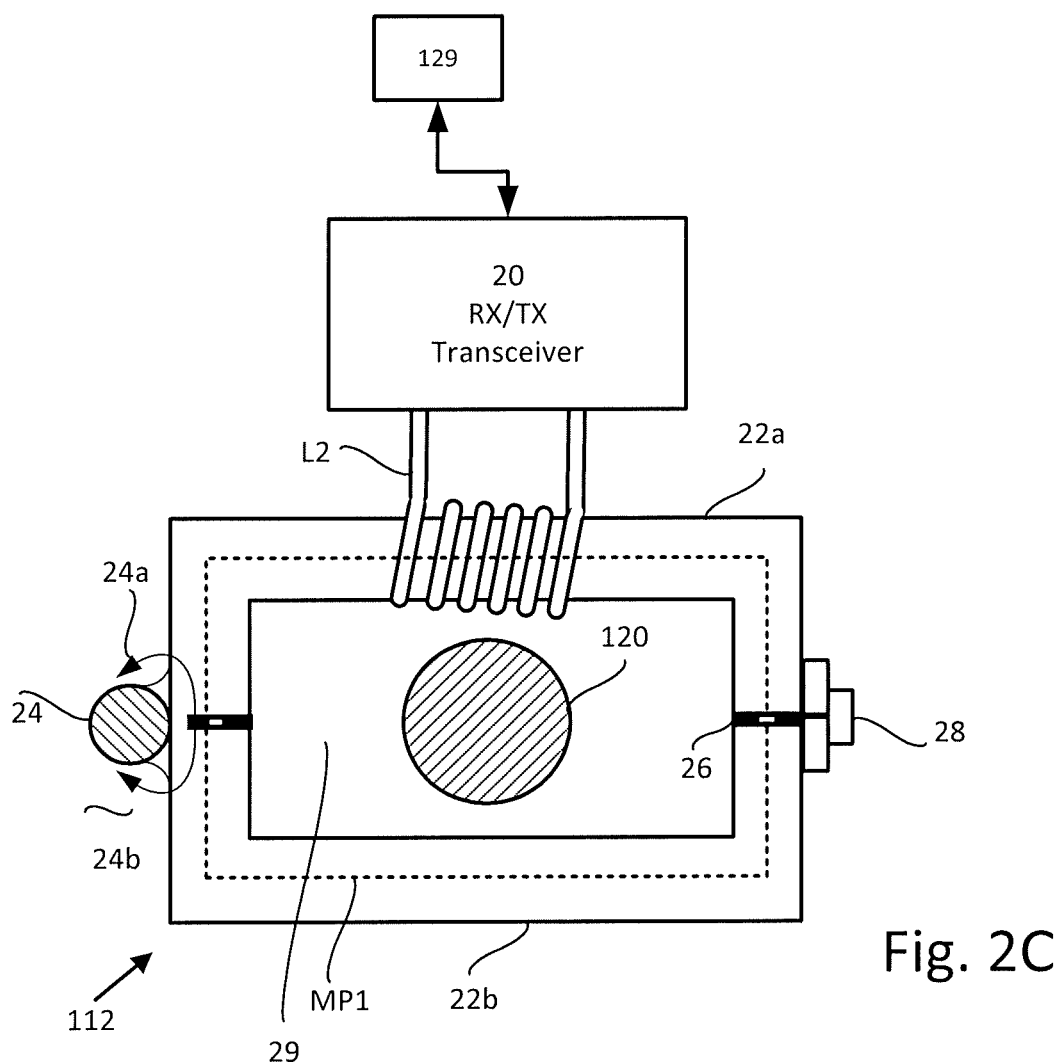
FIGS. 2C, 2D and 2E show further details of network units, according to one or more illustrative embodiments.

Reference is now made to FIG. 2C, which shows further details of network unit 112, according to one or more illustrative embodiments. Network unit 112 may include a magnetic core that further includes upper member 22a and lower member 22b. Upper and lower housings 220a and 220b are not shown in order to simplify the drawing. Upper member 22a may be separable from lower member 22b at opening 26. Upper member 22a and lower member 22b may pivot about hinge 24 as shown by respective arrows 24a and 24b. Upper member 22a may be magnetically joined to lower member 22b at opening 26 by use of fastener 28 to establish magnetic path MP1. A cross section of power line 120 is shown located in the aperture 29 formed between upper member 22a and lower member 22b when upper member 22a is fastened to lower member 22b with fastener 28. The aperture 29 formed between upper member 22a and lower member 22b when upper member 22a is fastened to lower member 22b may be rectangular as shown, or aperture 29 formed between upper member 22a and lower member 22b may be circular, elliptical, triangular, square, rectangular, or in a different polygon shape.

Network unit 112 may further include an inductor L2 that may be wound to form a coil around upper member 22a and may be connected to transceiver 20. Transceiver 20 may be connected bi-directionally to communication interface 129 so that signals from communication interface 129 to transceiver 20 may be transmitted by transceiver 20 and signals received by the receiver of transceiver 20 may be sent to communication interface 129. Aperture 29 between upper member 22a and lower member 22b may be of such as size so that upper member 22a when fastened to lower member 22b may cause power line 120 to be firmly clamped between upper member 22a and lower member 22b. A number of network units 112 may further be further mechanically mountable within a connection box, for example, or a number of network units 112 may be mechanically attached to each other. Alternatively, the magnetic core may be constructed of one piece instead of two pieces, such as upper member 22a and lower member 22b.

A magnetic coupling or transformer effect between power line 120 and inductor L2 may allow signals from communication interface 129 transmitted by the transmitter part of transceiver 20, to be induced into power line 120. Similarly, inductor L2 may allow signals present on power line 120 to be induced into inductor L2 and therefore to be received by receiver portion of transceiver 20, which may then be passed into communication interface 129. Connection wires 23 of FIG. 2B (not explicitly shown) may provide power to transceiver 20 and/or allow the passing of communication signals.

Figure 2D:
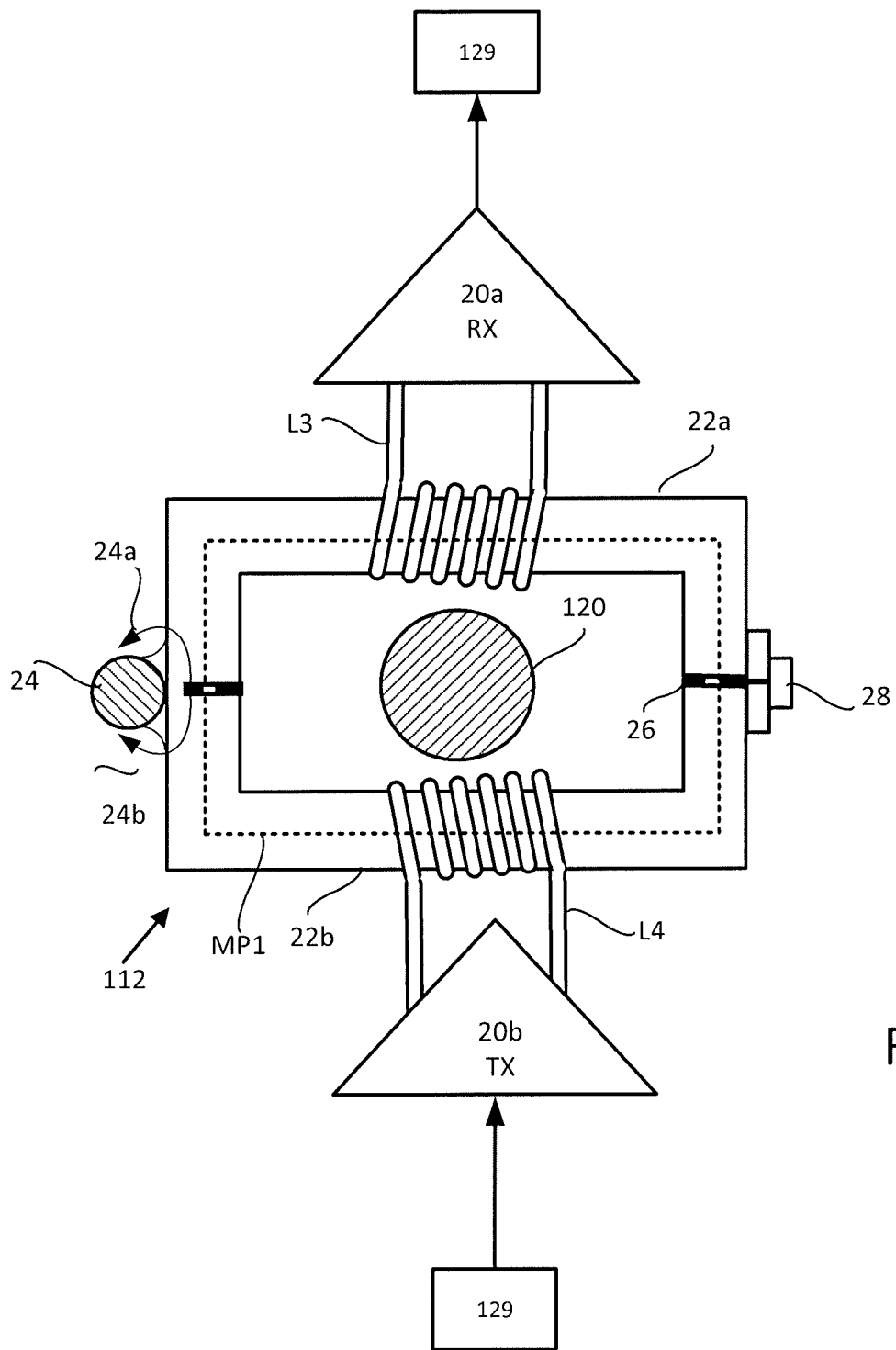

Reference is now made to FIG. 2D, which shows further details of network unit 112, according to one or more illustrative embodiments. Upper and lower housings 220a and 220b are not shown in order to simplify the drawing. Transceiver 20 may be separated into a separate receiver 20a and transmitter 20b. Both receiver 20a and transmitter 20b may be connected to communication interface 129 and respective inductors L3 and L4. Inductor L3 may be wound to form a coil around upper member 22a and inductor L4 may be wound to form a coil around lower member 22b. A magnetic coupling or transformer effect between power line 120 and inductor L3 may allow signals from communication interface 129 transmitted by transmitter 20b, to be induced into power line 120. Similarly, inductor L4 may allow signals present on power line 120 to be induced into inductor L4 and therefore to be received by receiver 20a, which may then be passed into communication interface 129. Connection wires 23 of FIG. 2B (not explicitly shown) may provide power to transceiver 20, receiver 20a and transmitter 20b and/or allow the passing of communication signals.

Figure 2E:
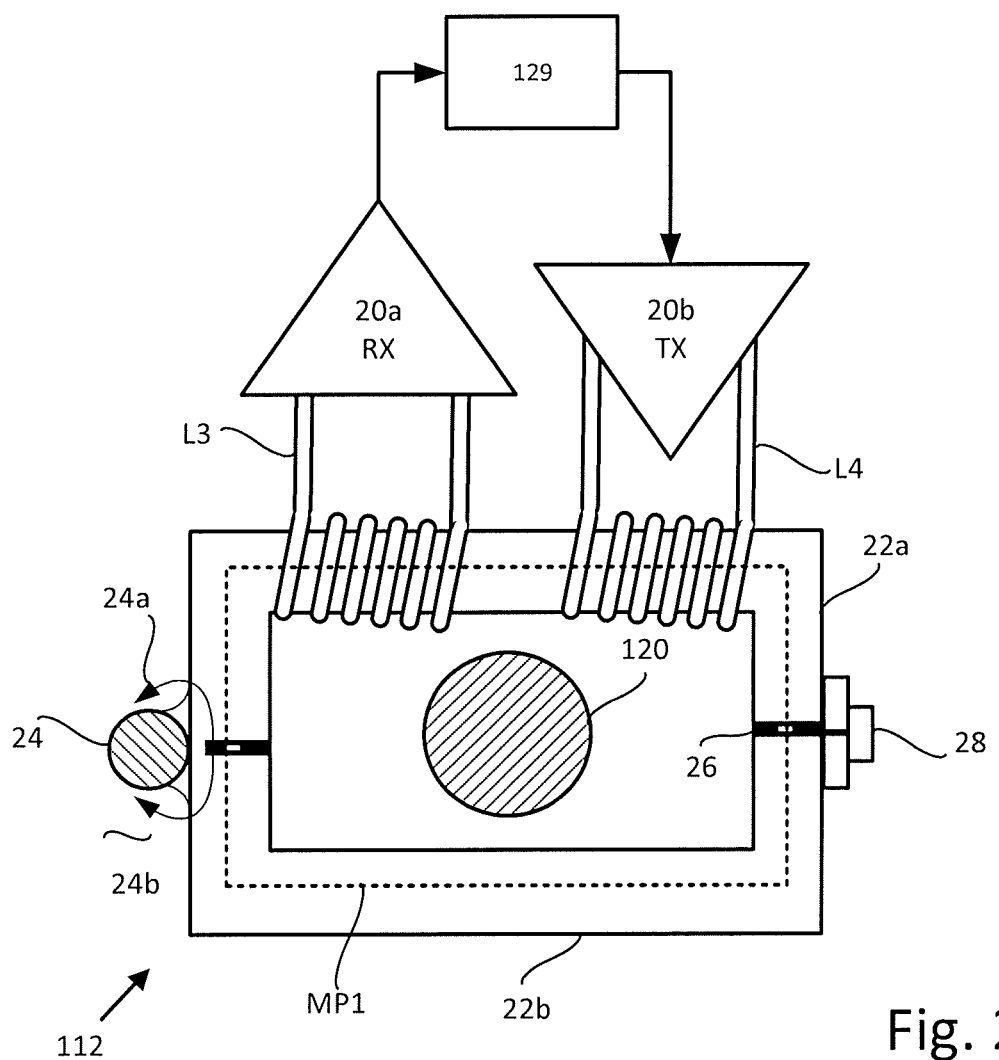

Reference is now made to FIG. 2E, which shows further details of network unit 112, according to one or more illustrative embodiments. Upper and lower housings 220a and 220b are not shown in order to simplify the drawing. FIG. 2E includes the same component parts as FIG. 2D, but both inductors L3 and L4 connected to respective receiver 20a and transmitter 20b are both wound to form a coil around upper member 22a. Receiver 20a and transmitter 20b both may connect to communication interface 129. Communication interface 129, previously has been described as being part of power modules 103 but may additionally be a part of power devices 107 and network units 112. Communication signals conveyed between network units 112 and respective communication interfaces 129 in general may include control signals to control power modules 103, for example, and to convey data to and from a controller or between power modules 103. The communication signals applied by network units 112 for communication signals maybe re-conditioned and re-repeated between network units 112 placed at various locations in a power system installation. Signals transmitted and received may include control signals, signals that identify a particular power module 103 and/or power devices 107. Identification of power modules 103 and/or power devices 107 may allow an association between a group of power modules 103 and a particular power device 107 for example. Signals may also represent a parameter sensed in power system 100 at the various electrical connections of power system 100 and/or various topographic locations of power sources 101, for example. The parameter may include voltage, current, power, coulombic charge, level of solar irradiance or temperature for example. For example, sensing of current may use a Hall effect sensor. Control signals based on the parameters sensed in power systems 100 may then be conveyed to particular power modules 103 to control the distribution of power to particular loads 109 or charge storage devices, for example.

Connection wires 23 of FIG. 2B (not explicitly shown) may provide power to transceiver 20, receiver 20a and transmitter 20b and/or allow the passing of communication signals.

While FIGS. 2C, 2D and 2E show inductive coupling, alternatives to inductive coupling may be used, which may include capacitive coupling or by direct coupling by wire or resistor, for example. Further aspects of coupling to superimpose and receive signals onto power lines 120 may be by a variable capacitance which may be configured to substantially match both lumped and distributed impedances of the power lines 120 at various points in power system 100. The matching of distributed and lumped impedances of and connected to the power lines 120 at various points in power system 100 may be done to ensure that substantially most of the signal power of signals may be superimposed and received respectively onto and from power lines 120. Substantially most of the signal power of signals superimposed and received respectively onto and from power lines 120 may be at least one way of improving signal to noise ratios (SNRs) at various points in power system 100. The variable capacitance may be by a varicap diode and/or the variable capacitance may be provided by a switched capacitor circuit controlled by controller 105 or a central controller. Measurement of the various electrical parameters at various points in power system 100 by sensors/sensor interfaces 125 and subsequent analysis may deem that both the lumped and distributed impedances of the power lines 120 and devices attached to power lines 120 at various points to be detrimental for effective communications. For example, the communications applied by network units 112 for facilitating monitoring, supplying and control of powers to loads 109 from power modules 103 and power devices 107 may therefore be, according to features described above, to enable dynamic and/or statically predefined configurations of power system 100.

Figure 2F:
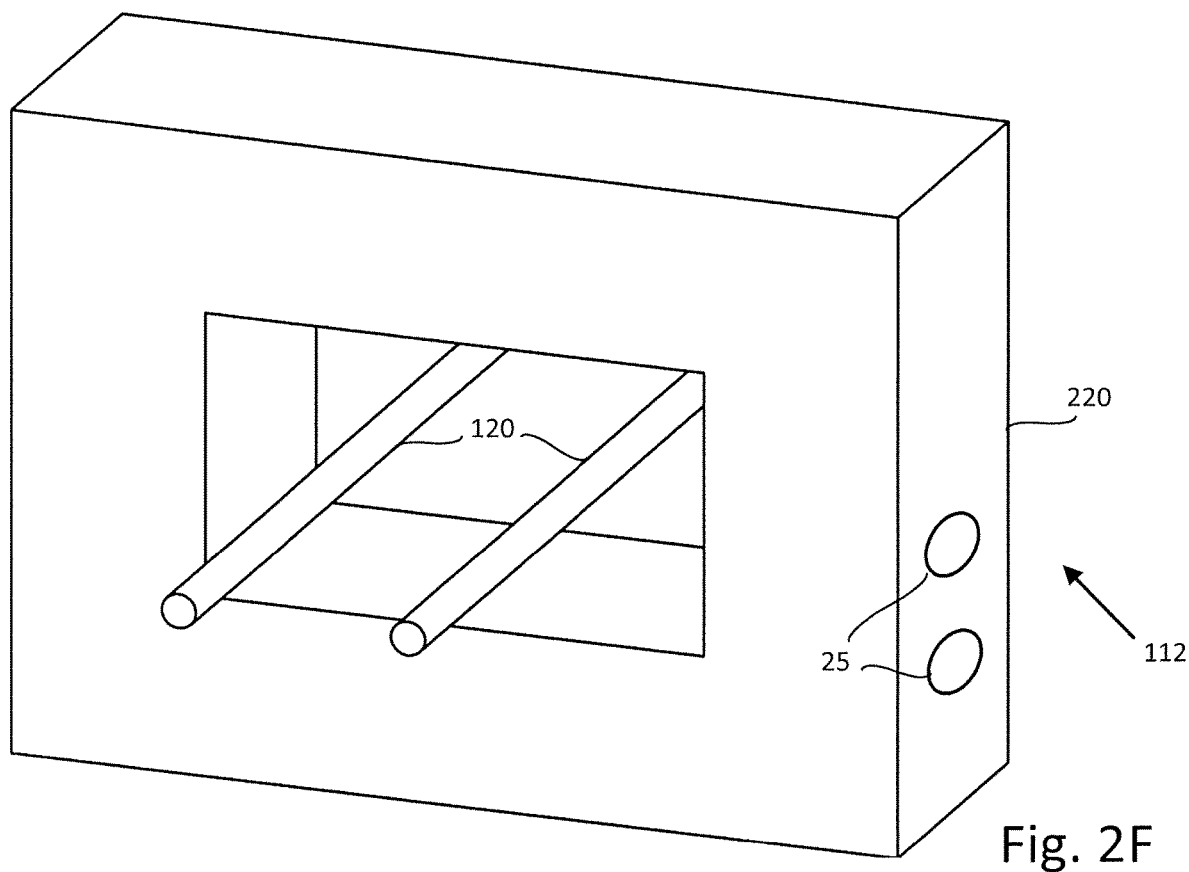
FIG. 2F shows an isometric view of a network unit, according to one or more illustrative embodiments.

Reference is now made to FIG. 2F, which shows an isometric view of a network unit 112, according to one or more illustrative embodiments. Network unit 112 is made from a single housing 220, but may also be made from two housings 220a and 220b as described previously above with respect to FIGS. 2A and 2B. Elliptical apertures 25 are shown that go through housing 220 where optional connection wires (e.g., connection wires 23 of FIG. 2B) may be inserted and connected to provide power to transceiver 20, receiver 20a and/or transmitter 20b (not shown) that may be located in housing 220. Two power lines 120 are shown inserted through the aperture of housing 220, and network unit 112 may receive and/or transmit communication signals over power lines 120.

Figure 2G:
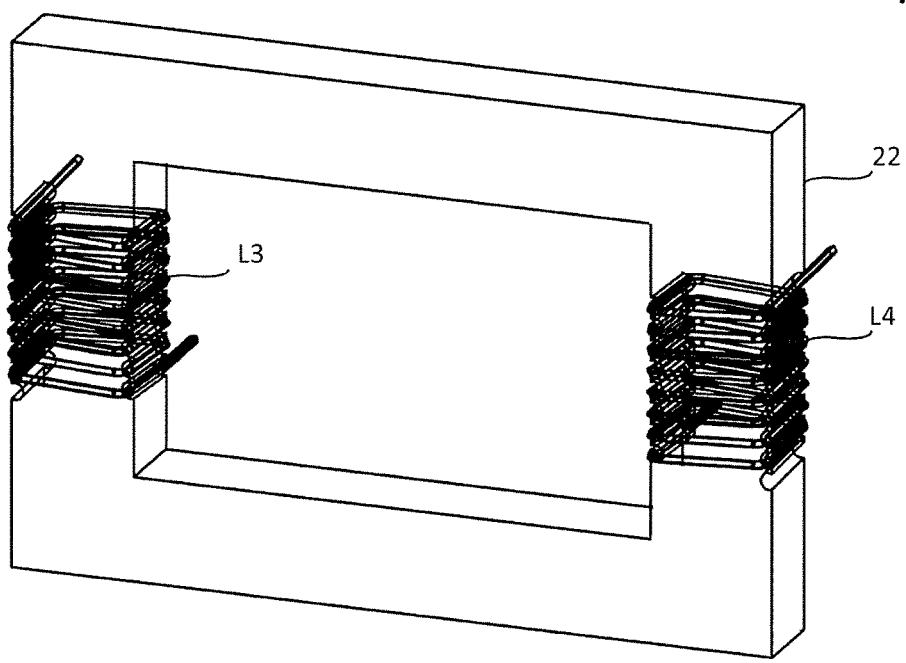
FIG. 2G shows an isometric view of a magnetic core, according to one or more illustrative embodiments.

Reference is now made to FIG. 2G, which shows an isometric view of a magnetic core 22, according to one or more illustrative embodiments. In some embodiments, magnetic core 22 may comprise two parts, an upper member and a lower member, similarly to as shown previously in FIGS. 2A, 2B, 2C, 2D and 2E. In some embodiments, magnetic core 22 may comprise a single, monolithic member. Inductors L3 and L4 may be wound around magnetic core 22 to form respective coils around magnetic core 22. Inductors L3 and L4 may be further connected to respective receiver 20a and transmitter 20b (not shown). Magnetic core 22 may be located and housed in a housing (e.g., 220). Alternatively, more than one magnetic core 22 may be located and housed in a housing (e.g. 220) such that for example, one magnetic core 20 may have inductor L3 connected to receiver 20a, while another magnetic core 20 may have inductor L4 connected to transmitter 20b (both not shown).

Figure 2H:
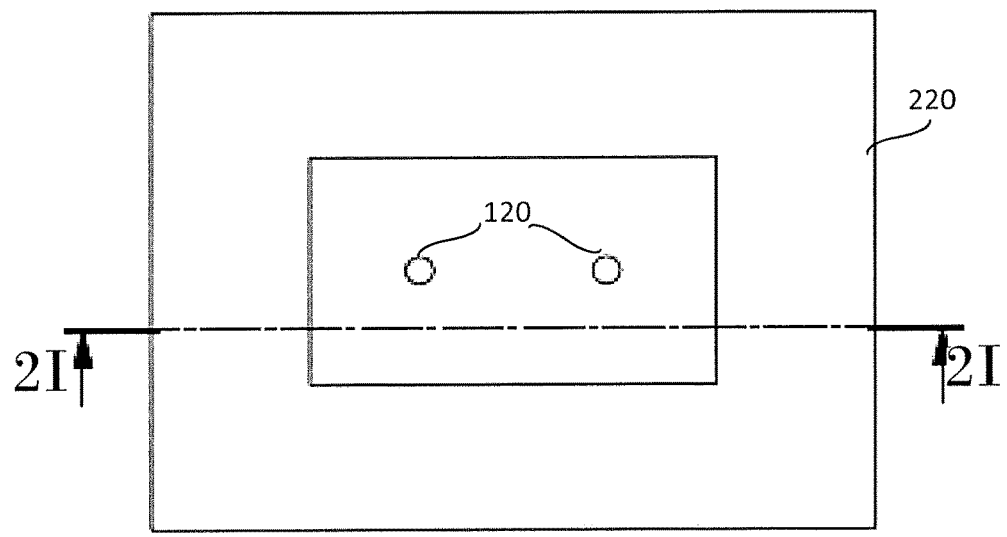
FIG. 2H shows a plan view of a network unit, according to one or more illustrative embodiments.
Figure 2I:
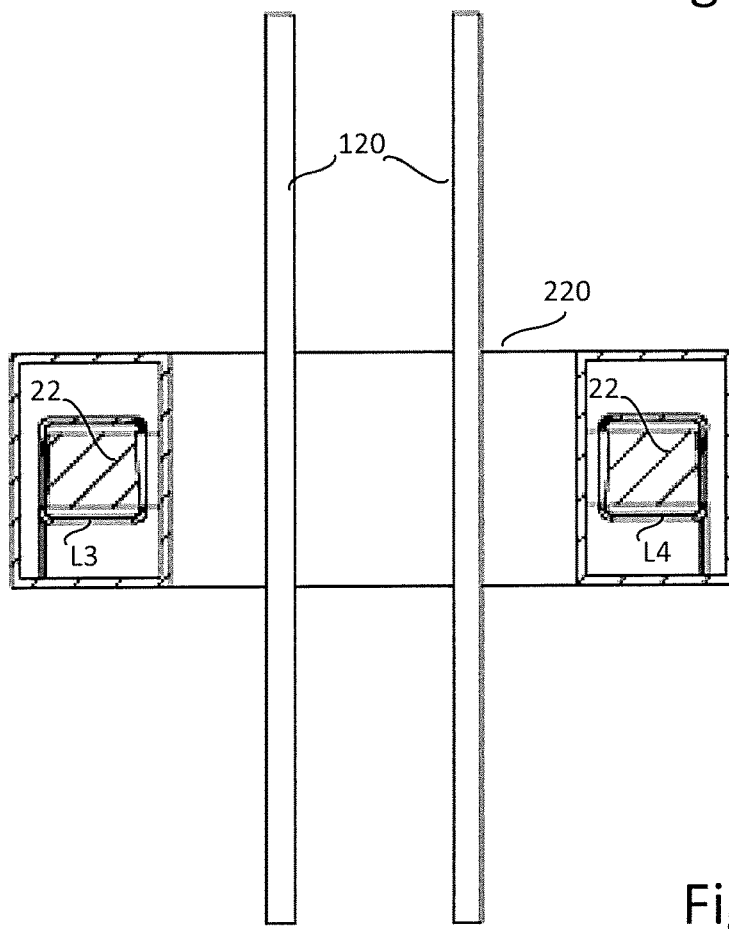
FIG. 2I shows a cross sectional view of a network unit, according to one or more illustrative embodiments.

Reference is now made to FIG. 2H, which shows a plan view and FIG. 2I which shows a cross sectional view A-A of network unit 112, according to one or more illustrative embodiments. With respect to the plan view, two power lines 120 are shown going through the aperture of housing 220. With respect to the cross sectional view A-A, inductors L3 and L4 are shown wrapped around in coils of respective members of magnetic 22 shown located and mounted in housing 220. Power lines 120 are shown going through the aperture of housing 220. Space between housing 220 and magnetic core 22 may allow for the mounting and connection of additional component such as sensors/sensor interfaces 125, controllers 105, communication interfaces 129, receiver 20a, transmitter 20b, and/or transceiver 20 (all not shown).

Figure 3A:
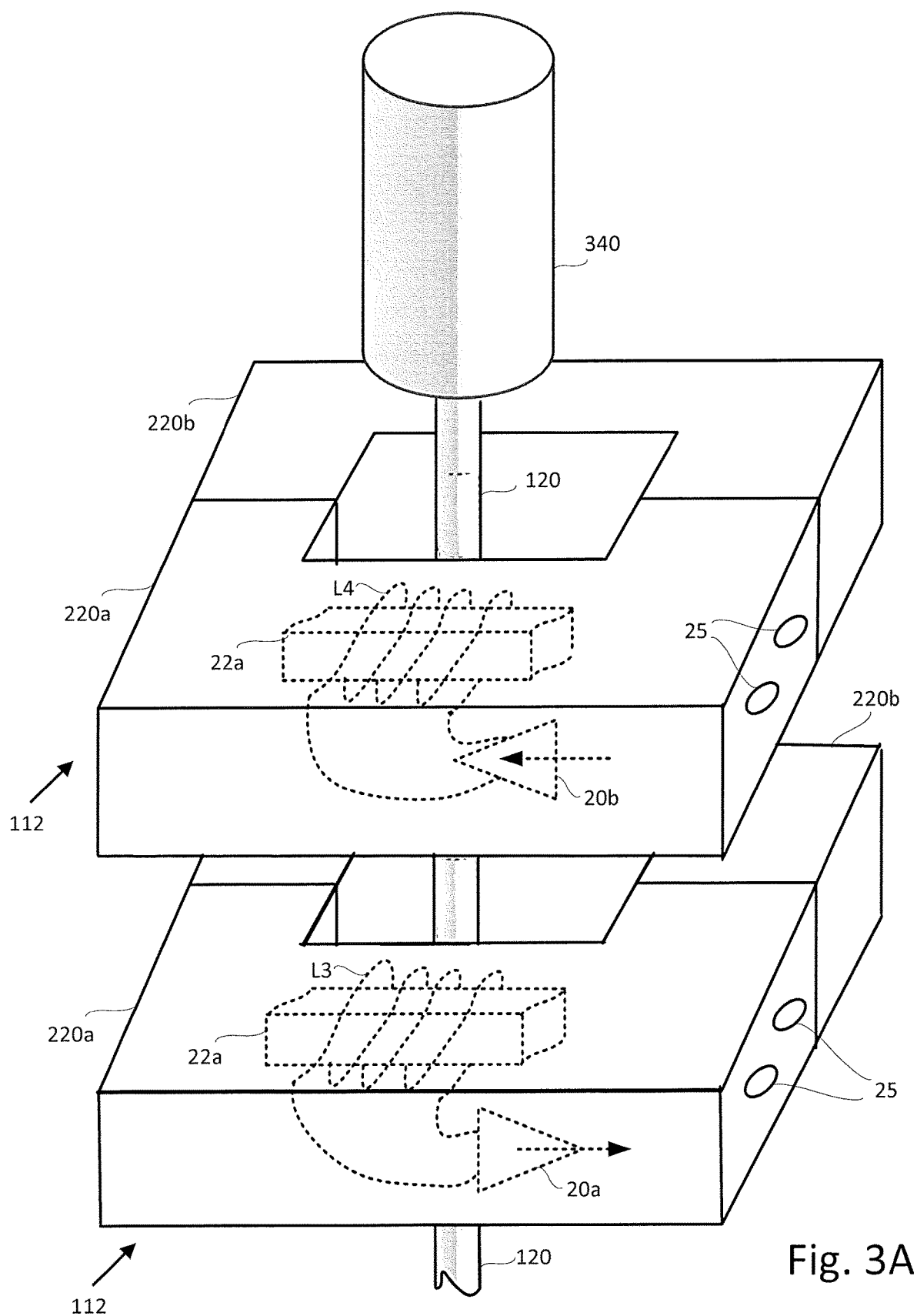
FIG. 3A shows another isometric view of details of a network unit, according to one or more illustrative embodiments.

Reference is now made to FIG. 3A, which shows another isometric drawing of details of two network units 112, according to one or more illustrative embodiments. A partial part of power line 120 is shown inserted in between two upper and lower housings 220a and 220b of each network 112. Partial parts of upper members 22a (shown by dotted lines) may be located in respective upper housings 220a. Alternatively, the housing of the magnetic core and the magnetic core for a network unit 112 may each be constructed of one piece of material instead of two pieces, such as upper member 22a/upper housing 220a and lower member 22b/lower housing 220b. The cross section of the aperture formed between upper housing 220a and lower housing 220b may be circular, elliptical, triangular, square, rectangular, or in a different geometric shape. Similarly, if both the housing of the magnetic core and the magnetic core for network unit 112 are each constructed of one piece of material instead of two, the aperture through a housing of the magnetic core and the magnetic core may be circular, elliptical, triangular, square, rectangular, or in a different geometric shape. The aperture formed between upper housing 220a and lower housing 220b may or might not physically clamp power lines 120. The apertures described above may accommodate the insertion of one or more power lines 120.

Power line 120 also may connect to a safety circuit 340 that may be a fuse, circuit breaker or isolation switch, for example. Inductors L3 and L4 may be wound around the respective magnetic cores of upper members 22a and may be further connected to respective receiver 20a and transmitter 20b. Alternatively, inductor L3 may be wound around the magnetic core of lower member 22b and may be further connected to a transceiver 20 as shown in FIG. 2C, for example. Elliptical apertures 25 are shown that go through lower housings 220a where connection wires 23 may be inserted and connected to provide power to transceiver 20, receiver 20a, and/or transmitter 20b.

FIG. 3A, which shows details of two network units 112 with each network units having separate magnetic cores, whereby one network unit 112 houses receiver 20a/inductor L3 and one network unit 112 houses transmitter 20b/inductor L4. Alternatively, one network unit 112 may house both transmitter 20b and receiver 20a and/or transceiver 20/inductor L2 on one magnetic core on various locations of a magnetic core as shown in FIGS. 2C, 2D and 2E. Alternatively, one network unit 112 may additionally house sensors/sensor interfaces 125, controllers 105, and/or communication interfaces 129. Separating receiver 20a and transmitter 20b into separate network units may be desirable, for example, in order to provide network units to a particular system using network units 112 for transmission only (e.g., transmitting monitored parameters to a logging and/or monitoring databases) or for reception only (e.g., to receive operational commands from a central controller).

Figure 3B:
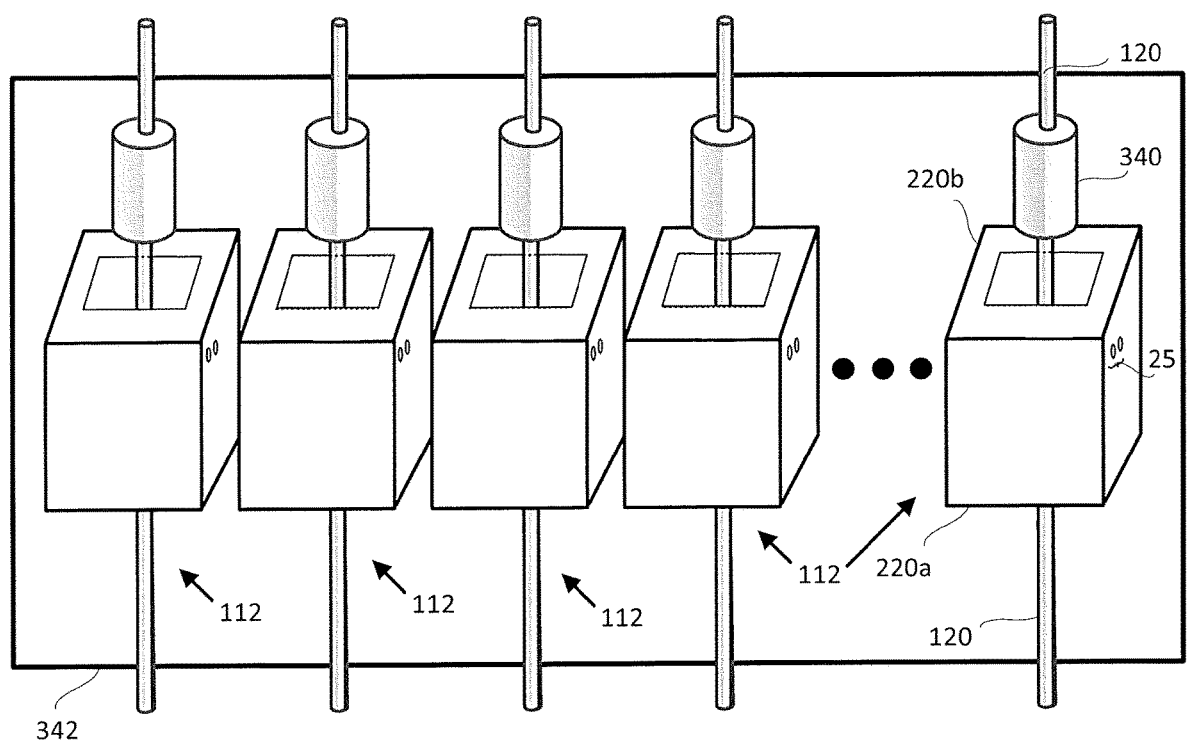
FIG. 3B shows multiple network units attached to a mounting plate, according to one or more illustrative embodiments.

Reference is now made to FIG. 3B, which shows multiple network units 112 attached to a mounting plate 342, according to one or more illustrative embodiments. Partial portions of power lines 120 are shown passing through network units 112 and may be attached to safety circuits 340. Mounting plate 342 may be mounted in a connection box (not shown) located at nodes A and B for example with reference to FIG. 1A. Other network units described below may be similarly mounted in connection boxes at various points in a power system for example. At nodes A and B for example, multiple power lines 120 from multiple parallel connection configurations 111 may all be present in the connection box (e.g., a string combiner box). In the connection box, the multiple power lines 120 may be often in close physical proximity to each other. The close proximity of power lines 120 to each other may allow reduced costs by coupling power lines 120 to network units 112 on a common mount or rack such as mounting plate 342, for example.

In terms of communications, the multiple network units 112 connection wires 23 may be further interconnected between elliptical apertures 25 and attached to the communication interface of a power device 107, power modules 103, and/or central controller that may be located within the connection box and/or in proximity to the connection box.

By way of example, a pair of networks units 112 may be located in parallel to each other on respective corresponding positive and negative power lines 120 used in power system 100. A differential comparison of currents and/or voltages in positive and negative power lines may indicate the possibility of leakage voltages and/or currents and/or arcing taking place in power system 100. All of the considerations described for the connection box may be applied to the descriptions that follow.

Figure 3C:
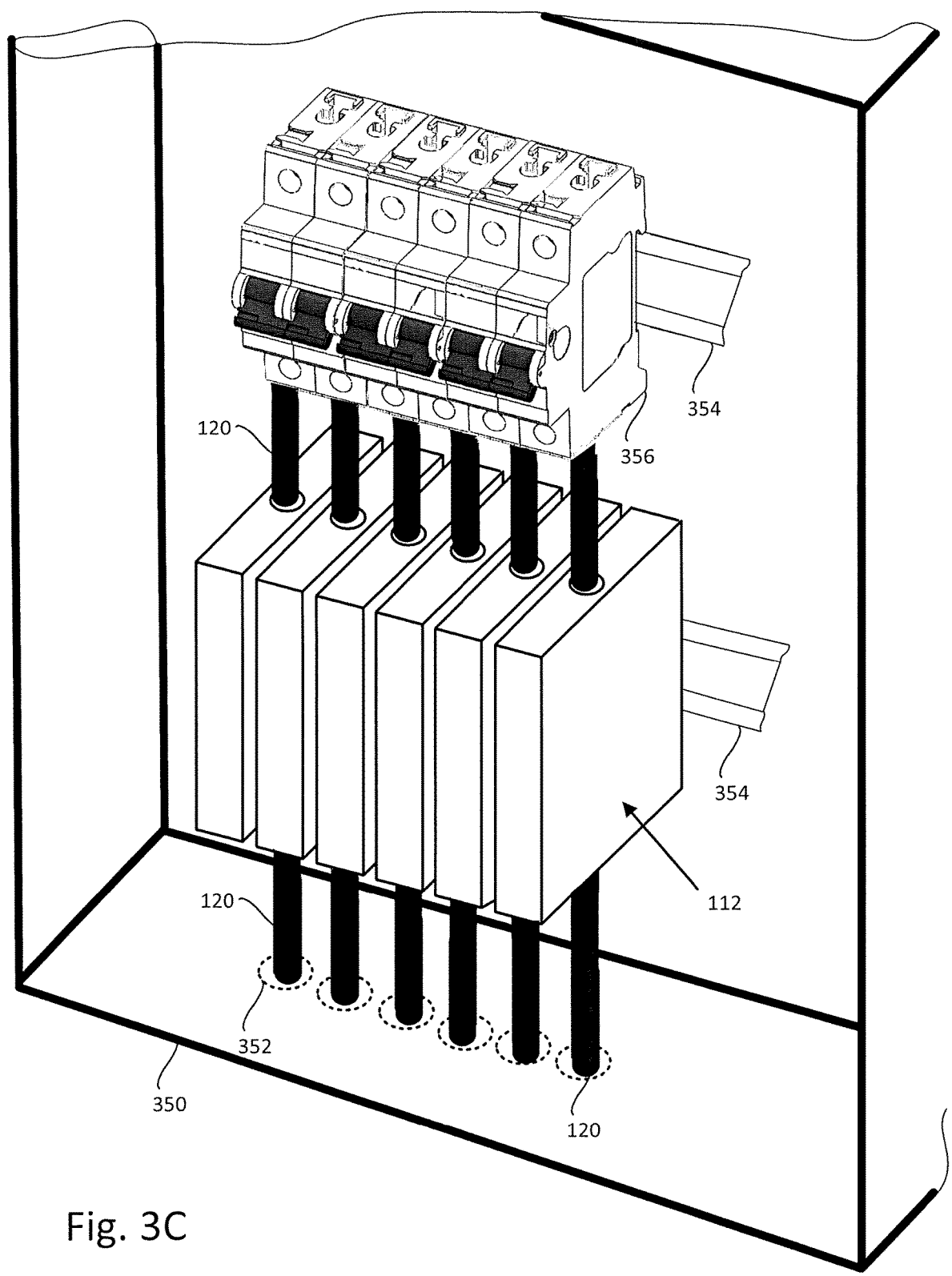
FIG. 3C shows multiple network units mounted in a connection box, according to one or more illustrative embodiments.

Reference is made to FIG. 3C, which shows multiple network units 112 mounted in a connection box 350, according to one or more illustrative embodiments. The multiple network units 112 are shown mounted on a DIN (Deutsches Institut für Normung) rail 354 that is mountably attached to the back panel of connection box 350. Similarly, multiple circuit breakers 356 are shown mounted on a DIN rail 354 that is mountably attached to the back panel of connection box 350. Multiple power lines 120 may be inserted though respective apertures of each network unit 112 and terminated in a respective circuit breaker 356. Power lines 120 are shown entering through the bottom panel of connection box 350 through cable openings 352. Connection box 350 may additionally include safety circuits 340 (as shown in FIG. 3B) that may further include electrical isolators, circuit breakers 356, and residual current devices (RCDs). Connection box 350 may additionally include additional DIN rail 354 to mount additional terminal blocks for interconnecting power lines 120. Connection box 350 may additionally provide housing and connection of power modules, power devices, and control units.

Figure 4A:
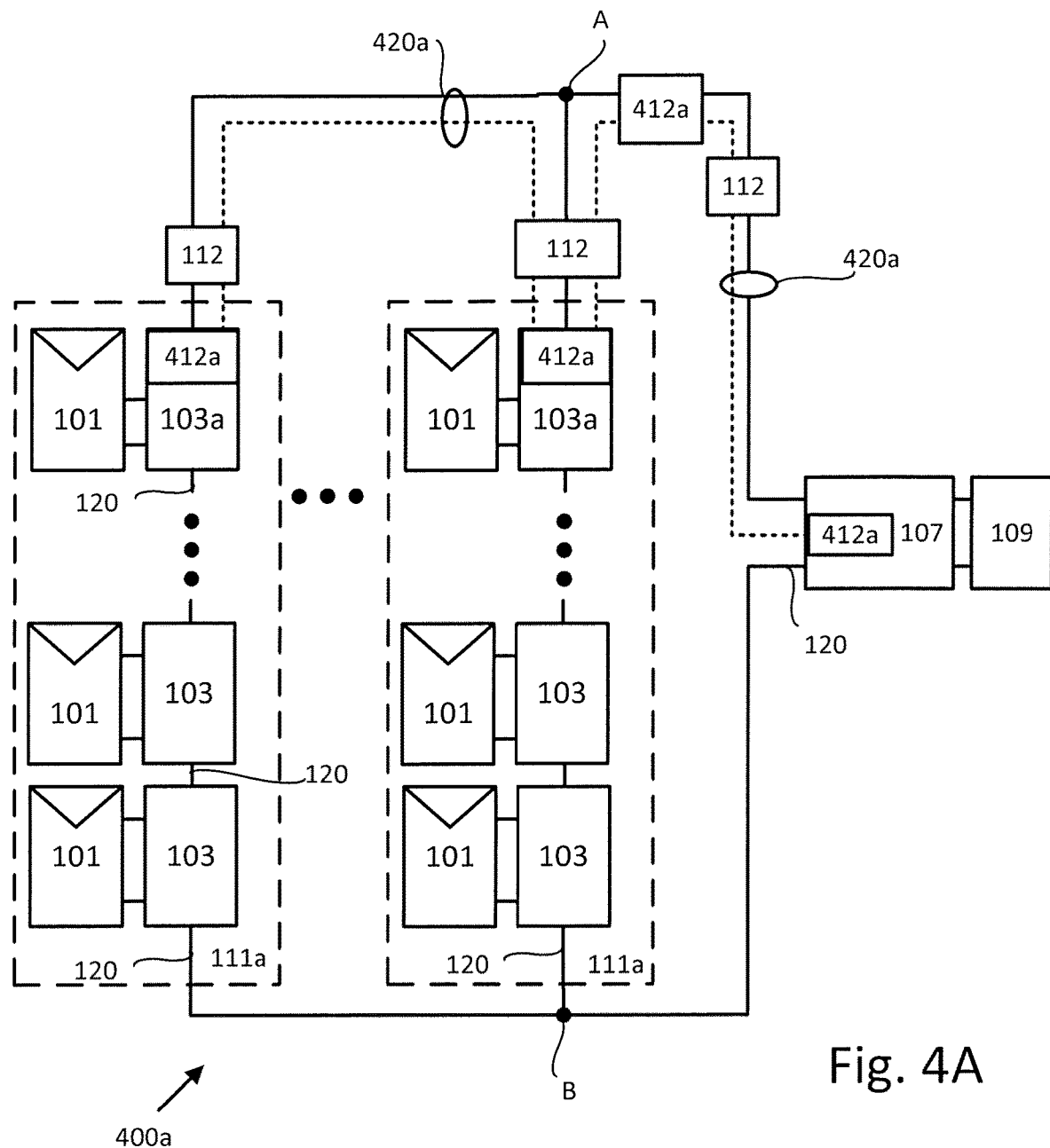
FIG. 4A shows a block diagram of a power system, according to one or more illustrative embodiments.

Reference is made to FIG. 4A, which shows a block diagram of a power system 400a, according to one or more illustrative embodiments. A connection configuration 111a includes a power source 101 with direct current (DC) output terminals that may be connected to the input terminals of power module 103. The input of power module 103a may similarly be connected to the output of a power source 101. DC output terminals of power modules 103 and the DC output terminals of power module 103a in connection configuration 111a may be connected in series to give a series connection. The series connection may include the DC outputs of power modules 103 connected in series with power lines 120 to the bottom DC input of power module 103a, and the top DC output of power module 103a connected to the electrical portion of power line 420a (shown by solid line) that includes a fiber optic portion (shown by dotted line). Multiple connection configurations 111a may be connected in parallel across the input of power device 107 that may be a direct current (DC) to DC converter or may be a DC to alternating current (AC) inverter supplying power to load 109. Load 109 may be a battery, an alternating current (AC) grid or a DC grid, or a DC to AC inverter. Network unit 112 may be attached to power lines 120/420a at various locations such as the top of a series string of power module 103 outputs, at connection nodes A and/or B or at power device 107. In general, any number of network units 112/412a may be attached to power lines 120/420a at any number of locations of power system 400a. The attachment of network units 112/412a to power lines 120/420a may include electrical-mechanical, optoelectronic-mechanical, and electromagnetic-mechanical mechanisms.

Power module 103a may be the same as power module 103 but may also further include a network unit 412a operatively attached to a communication interface similar to a communication interface 129 of a power module 103. Network unit 412a may be an integral part of a power module 103a. Network unit 412a may be operatively attached to communication interface 129 of a power module 103 or operably attached to a similar communication interface of power device 107.

Network unit 412a may be attached to power lines 420a at various locations such as the top of the series string of power modules 103/103a outputs, at connection nodes A and/or B or at power device 107. In general, any number of network units 412a may be attached to power lines 420a at any number of locations. Power lines 420a may include a fiber optic cable (shown in dotted line) integrated with a power cable (shown by solid line) that is similar to power line 120.

Network unit 412a may be connected to a network unit 112 to enable communication of both transmitted and received signals between respective power modules 103a and power modules 103. A feature of network unit 412a may be to combine an optical-cable integrated power line with electro-magnetic circuitry of network unit 112 so as to transmit and receive signals using power line communications over power lines 120 and the power cable portion (shown by solid line) of power line 420a as described above with respect to the features of network unit 112) as described above with respect FIGS. 2C, 2D and 2E.

Network unit 412a may be further used to enable communication of both transmitted and received signals between power modules 103a and power devices 107 connected by power line 420a. The connection to enable communication between power modules 103a and power devices 107 may use the fiber optic portion of power line 420a (shown by dotted line) or use the electrically conductive portion of power line 420a (shown by solid line) for power line communications (PLCs) as described above with respect FIGS. 2C, 2D and 2E.

The signals transmitted and received may include control signals, signals which identify a particular power module 103/103a and/or power device 107. Identification of power modules 103/103a and/or power device 107 may allow an association between a group of power modules 103/103a and a particular power device 107, for example. Signals may also represent a parameter sensed in power systems 100/400a at the various electrical connections of power system 100 and/or topographic locations of power sources 101, for example. The parameter may include voltage, current, power, coulombic charge, level of solar irradiance, or temperature, for example. Control signals based on the parameters sensed in power systems 100/400a may then be conveyed to particular power modules 103/103a to control the parameters sensed in power systems 100/400a.

Figure 4B:
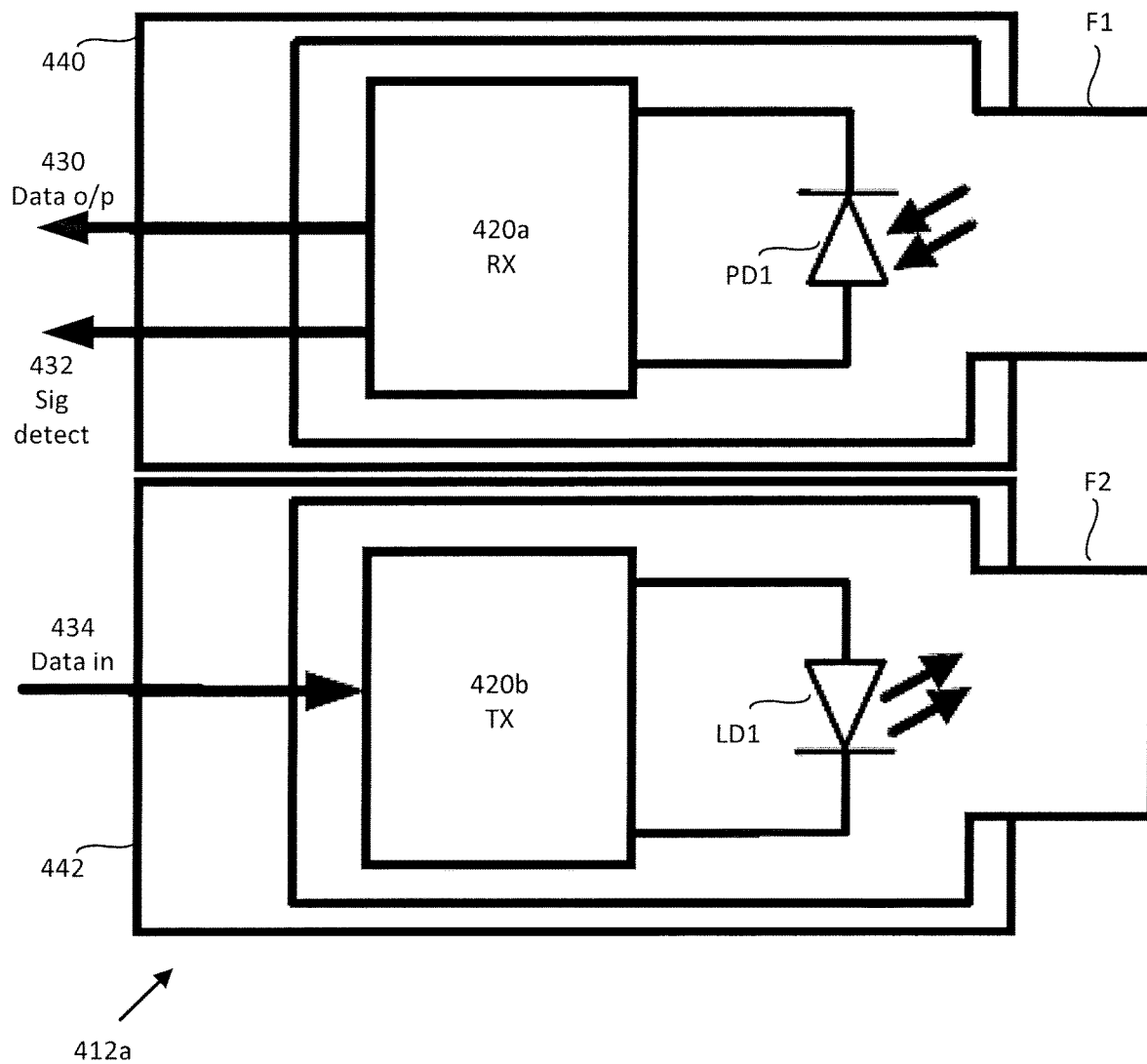
FIG. 4B shows further details of a network unit, according to one or more illustrative embodiments.

Reference is made to FIG. 4B, which shows further details of network unit 412a, according to one or more illustrative embodiments. Network unit 412a includes a connection housing 440 for a fiber optic connector F1. Connection housing 440 may include a receiver 450a connected to a photo-diode PD1 that receives light from fiber optic connector F1. Fiber optic connector F1 may connect to the fiber optic cable of power line 420a. Photodiode PD1 may convert the received light from fiber optic connector F1 into an electrical signal that is applied to the input of receiver 450a. Receiver 450a may decode the electrical signal into data on data output 430 and may provide indication of a detected signal at detected signal output 432. Both data output 430 and detected signal output 432 may be coupled to a communications interface such as communications interface 129.

Network unit 412a may further include a connection housing 442 for a fiber optic connector F2. Connection housing 442 includes a transmitter 420b connected to a laser diode LD1 that transmits light from fiber optic connector F2. Fiber optic connector F2 may connect to the fiber optic cable of power line 420a. Laser diode LD1 converts the data on data input 434 from an electrical signal to a light signal for transmission on fiber optic connector F2. Multiple connection housings 440 and 442 may be included in network unit 412a.

Transmitter 420b and receiver 450a of network unit 412a may be operatively attached to a communication interface similar to a communication interface 129 of a power module 103. The communication interface in power modules 103/103a and power devices 107 may be operatively attached to transmitter 420b and receiver 450a of network unit 412a. In general, according to various features described above, network units 112 and/or 412a may be integrated into power modules 103/103a, and/or power devices 107.

Communication interfaces 129 may be attached to or be an integral part of power modules 103/103a, power devices 107 and network units 112/412a. As such, communication interfaces 129 according to embodiments described above are able to interface to allow communication of signals using Power Line Communication (PLC) technology that enables sending data over existing power cables, or wireless technologies such as ZIGBEE™, Wi-Fi, cellular communication or other wireless methods. Communication interface 129 may also include a mechanism for opto-electronic communication that includes optical fibers to convey data and/or commands from and to other devices. Network units 112/412a may be connected to various parts of power systems 100/400a installation via communication interfaces 129 that may be configured to enable signals to be superimposed onto power lines 120/420a and to be received from off power lines 120/420a via network units 112/412a. Coupling between the network units 112/412a and the power lines 120/420a may be an electromagnetic coupling, a capacitive or a direct coupling.

Sensors/sensor interfaces 125 connected to communication interfaces 129 and network units 112/412a may enable sensing of parameters such as powers, currents, voltages, coulombs, characteristic impedance and temperatures of their respective inputs and outputs, and may be used to assess the best way of superimposing communication and control signals onto power lines 120/420a and receiving communication and control signals off power lines 120/420a. Based on the assessment, signals may be conveyed instead via wireless technology or by use of fiber optic transceivers and fiber optic cables, for example. The fiber optic cables may be an integral part of the power lines 120/420a. Communication signals in general may include control signals to control power modules 103/103a, for example, and to convey data to and from a controller 105 or between power modules 103/103a. The communication signals applied by the network units 112/412a for communication signals maybe re-conditioned and re-repeated between network units 112/412a. Network units 112/412a placed at various locations in the power systems 100/400a installations, for example.

According to some illustrative embodiments, DC power sources are connected to a load and/or a storage device via multiple power modules to for a power system. Network units placed at various points in power system may allow communication between various parts of power system to allow the sensing and conveying of sensed parameters to a controller to monitor and control, for example, the power modules. The power modules may control power such that a load and/or a storage device may match the DC power from the DC power sources, in which power may be shed from the load and/or the storage device. Optionally, DC power from the storage device may be matched and supplied to the load, or optionally DC power from the DC power sources may be matched and supplied to the load. To control power, the power modules may include sensors capable of sensing parameters such as powers, currents, voltages, coulombs, and temperatures of their respective inputs and outputs.

According to some illustrative embodiments, network units may be connected to various parts of a power system installation and may be configured to enable signals to be superimposed onto power lines and to be received from off power lines. Coupling between the network units and the power lines may be an electromagnetic coupling, a capacitive or a direct coupling. Sensors capable of sensing parameters such as powers, currents, voltages, coulombs, characteristic impedance and temperatures of their respective inputs and outputs may be used to assess the feasibility of superimposing communication and control signals onto power lines and receiving communication and control signals off power lines. Based on the assessment, signals may be conveyed instead via wireless technology or by use of fiber optic transceivers and fiber optic cables, for example. The fiber optic cables may be an integral part of the power lines. Communication signals in general may include control signals to control power modules for example and to convey data to and from a controller or between power modules. The communication signals applied by the network units for communication signals maybe re-conditioned and re-repeated between network units placed at various locations in the power system installation.

According to some illustrative embodiments, the state of charge of storage devices may be sensed and communicated between various parts of the power system by use of the network units. Upon the sensed charge of the storage device being above a first predetermined level of state of charge, the power stored in the storage device may be supplied to a load, whereby the stored charge of the storage device is discharged to the load. Upon the sensed charge of the storage device being below a second predetermined level of state of charge, the storage device may then be charged and power to the load may be supplied responsive to the measured power.

According to some illustrative embodiments, a power circuit may be connected at its output to a load and to a storage device. A switch may be provided at an output terminal of the power circuit, to enable connection or disconnection between the output terminal of the power circuit and an input terminal of the storage device. Control of the switch may be based on communications between network units in the power system, which may convey measured parameters of the power system to a controller. With the switch in an ON position, the load and the storage device are connected in parallel across an output terminal of the power circuit. With the switch in an OFF position, the load remains connected across the output terminal of the power circuit, and the storage device is disconnected from the output terminal of the power circuit. In the context of a photovoltaic (PV) panel implementation of a power system, operation of the switch in the ON position may allow power to be supplied to the load and to the storage device when power from a power source (e.g., solar panel) providing power to the power circuit is sufficient (e.g., during the daytime). Operation of the switch in an OFF position may allow power to be supplied to the load if charging of the storage device is to be avoided, such as when the storage device is already substantially fully charged, or to reduce the number of charging cycles of the storage device, or when power from the power source supplying power to the power circuit is insufficient to both power the load and the charge the storage device. When power from the power source is insufficient (e.g., during the nighttime), the switch may be placed in the ON position, allowing power from the storage device to be applied to the load.

According to some illustrative embodiments, the groups of DC power sources may include groups of DC power sources where the direct current to supply a load and/or a storage device may be derived from renewable energy sources such as sunlight, wind, rain, tides, waves, and geothermal heat. Devices that convert these renewable energy sources include for example photovoltaic solar generators, wind generators and wind turbines. The groups of DC power sources may also include groups of DC power sources where the direct current is derived from non-renewable energy sources. Devices that convert these non-renewable energy sources into DC power to supply a load and/or a storage device may include petrol, oil and gas generators and/or turbines for example. The direct current may also be derived from rectified or converted sources of alternating current provided from a switched mode power supply, dynamo or alternator for example.

According to some illustrative embodiments, DC power sources in a DC power system are interconnected to various groups of DC sources. Each group of DC sources may contain different types of DC power derived from both renewable and non-renewable energy sources, so that the DC power generated may be configured to meet the criteria of providing an uninterruptable source of DC power to a load from the DC power sources and/or to store some of the DC power in a storage device. A part of the criteria may be to utilize energy previously stored in the storage device to subsequently supply power and what might be considered to be emergency power to the load when the DC sources are not able to produce power owing to lack of sunlight, wind and/or fuel for example.

According to some illustrative embodiments, DC power sources may include a connection of DC sources to a load and/or storage device via multiple power modules. The power modules may control power responsive to sensed parameters communicated between various parts of the power system by use of the network units. Control may be such that the load and/or storage may match the DC power from the DC power sources, power may be shed from the load and/or storage. Optionally DC power from storage device may be matched and supplied to the load or optionally DC power from the DC power sources may be matched and supplied to the load. To control power, the power modules may include the capability of sensing parameters such as powers, currents, voltages, coulombs, temperatures of their respective inputs and outputs via sensors to a controller.

According to some illustrative embodiments, the power modules may control power to the load and/or storage device according to a load profile. The load profile may include an information update via communication interfaces included in the power modules that communicate with each other via the network units to receive weather information such as present and forecasted temperature, wind speed, cloud cover and amount of sunlight for example. The load profile may also include updated information with regards to an updatable load demand history of the power system with reference to daily and nightly demand, weekday demand and monthly demand. The updatable load demand history of the power system may also take into account the amount of fuel and cost of fuel available to utilize petrol, oil and gas generators and/or turbines instead of using other types of DC power provisioning, for example.

According to some illustrative embodiments, the power modules may control power to the load and/or storage device according to a charge profile of a storage device. Using the example of a battery for the storage device, the charge profile may ensure optimal charging of the battery that may prefer a constant voltage level or constant current for at least a minimum period of time. The charge profile may also specify control of the temperature of the battery during charging via the network units, which may improve the performance and/or reliability of the battery, since the battery may need to stay cool when being charged so as to ensure optimal charging.

According to some illustrative embodiments, consideration may be given to different types of batteries when charging and discharging to ensure that correct voltages, currents, temperatures and appropriate time periods of charge and discharge are monitored, controlled via the network units and applied to batteries so as to avoid damage to the batteries. In addition, the charge profile may include reconfiguration of the charge profile based on data of the transfer of charge and/or discharge of a battery in order to access the ageing and use of batteries. Such data logging via the network units may then be used to provide an estimate of projected battery life and timing of battery maintenance and replacement for example.

According to some illustrative embodiments, the power modules may be configurable via the network units to control the delivery of power of the DC sources to a load and/or a storage device. The power modules may be configurable via the network units to control the delivery of power to a load from energy previously stored in the storage device. The power modules may be configurable to control the delivery of power to a load from both the DC power sources and the storage device together.

According to some illustrative embodiments, a method for a power system that may include a controller, multiple DC power sources, multiple DC power modules, multiple bi-directional power modules and multiple storage devices. In the method, each of the power sources may be coupled to a respective DC power module. The power modules outputs may be coupled in a connection that may be a series connection of the power modules outputs, to form thereby, a serial string of power module outputs. The connection may also be a parallel connection of the power modules outputs. The serial string or the parallel connection may be coupled to a load and may be also coupled to the bi-directional power modules. Each of the bi-directional power modules may be coupled to respective storage devices. Power of each of the power sources may be measured by sensors provided with each of the power modules.

According to some illustrative embodiments, upon the power being measured, a signal may be transmitted by a network unit to the power module and/or a bi-directional power modules. The signal sent to power modules via the network units may serve the function of instructing the power modules to shut down completely (e.g., using an explicit message) due, for example, to a safety condition in the power system, to reduce power (e.g., an explicit message or lack of a signal) in order to shed power, to let the power modules to continue to control power at the present level or to increase power to a load and/or storage device. In general, the supply of power to the load and/or storage device may be controlled responsive to the power measured. The load may comprise multiple loads, and multiple DC power modules may be respectively coupled between the serial string and the loads so that loads with different voltage levels and current requirements may be accommodated. Similarly, different types of storage devices may also include respective bi-direction power modules so as to accommodate the different voltage levels and current level requirements such as constant voltage or constant current for charging the storage device for example. The bi-directional nature of the power modules of respective storage devices also allow the accommodation and provision of the different voltage levels and current level requirements of the multiple loads, when power to the loads is provided from the storage devices.

According to some illustrative embodiments, the control of power supplied to the load via a network unit may further include at least one of the storage devices to be depleted prior to subsequent charging of the at least one storage device, thereby mitigating damage to the at least one storage device. The at least one storage device depleted may additionally demand that at least one of the other the storage devices remains substantially charged so that it may be used in an emergency situation for example or to satisfy a requirement that a minimal amount energy is always available to be supplied.

It is noted that various connections are set forth between elements herein. These connections are described in general and, unless specified otherwise, may be direct or indirect; this specification is not intended to be limiting in this respect. Further, although elements herein are described in terms of either hardware or software, they may be implemented in either hardware and/or software. Additionally, elements of one embodiment may be combined with elements from other embodiments in appropriate combinations or sub-combinations. For example, sensor(s), power source (s), storage element(s), and interconnections of one embodiment may be combined with similar elements of another embodiment and used in any combination or sub combination. For example, network unit 112 may be combined with network unit 412a so that the fiber optic transceiver part may provide communications between parts of power systems 100/400a when good PLC communications in certain sections of power systems 100/400a may be difficult to achieve. Another example may be the possible use of network units 112/412 as repeaters and/or to re-condition signals sent between various sections of power systems 100/400a. Further, the detachable/reconnectable nature of network units 112/412 may also allow for a retrofit of an existing power system so that power produced may be monitored and controlled via use of network units 112/400a.

One skilled in the art will recognize that the various embodiments detailed above may be combined in suitable combinations and that portions of the embodiments may be unitized in various sub combinations. For example, network units 112 of FIG. 3C may be designed and disposed in a connection box 350 and may communicate with additional network units 112 designed as shown as FIG. 2A and installed as part a connection configuration 111 as shown in FIG. 1A.

The invention claimed is:

1. An apparatus comprising:
   a plurality of safety circuits, wherein each safety circuit of the plurality of safety circuits is connected to a serial string of a plurality of power modules, wherein the serial string of the plurality of power modules is connected between a first node and a second node and comprises a plurality of direct current (DC) power lines, and wherein the plurality of DC power lines comprise:

a positive power line connecting the serial string to the first node, and
a negative power line connecting the serial string to the second node; and
a plurality of network devices comprising at least:
a first network device comprising a first sensor, and wherein the first network device is inductively coupled to the positive power line of the plurality of DC power lines of the serial string, and
a second network device comprising a second sensor, and wherein the second network device is inductively coupled to the negative power line of the plurality of DC power lines of the serial string,
wherein the plurality of network devices are configured to:
sense a first parameter and a second parameter by using the first sensor and the second sensor, respectively; and
send, via at least one DC power line of the plurality of DC power lines, a signal comprising an indication of the first parameter and the second parameter, wherein the at least one DC power line of the plurality of DC power lines is configured to conduct the signal to a central controller, and wherein a differential between the first parameter and the second parameter indicates a presence of a current leakage in the serial string.

2. The apparatus of claim 1, wherein the plurality of network devices are attached to a common mount.

3. The apparatus of claim 2, wherein the common mount comprises one of a rack, a mounting plate and a Deutsches Institut für Normung (DIN) rail.

4. The apparatus of claim 3, further comprising an additional DIN rail configured to mount additional terminal blocks for the plurality of DC power lines.

5. The apparatus of claim 1, wherein the plurality of DC power lines are in close physical proximity with respect to each other such that the plurality of DC power lines are coupled on a mount.

6. The apparatus of claim 1, wherein a safety circuit of the plurality of safety circuits comprises at least one of: an electrical isolator, a circuit breaker, and a residual current device (RCD).

7. The apparatus of claim 1, wherein the first network device further comprises:
a housing, wherein the first sensor is disposed inside the housing;
a magnetic core disposed inside the housing, wherein the magnetic core comprises at least one aperture therethrough, and wherein the positive power line passes through the at least one aperture;
an inductor coil wrapped around the magnetic core and passing at least once through the at least one aperture; and
a transceiver operatively attached to the inductor coil, wherein the transceiver is configured to receive a second signal present on the positive power line and send a third signal, which is based on the second signal, via the positive power line.

8. The apparatus of claim 7, wherein the magnetic core comprises two members attachable and re-attachable to each other to form the at least one aperture.

9. The apparatus of claim 7, wherein the transceiver is operatively attached, via the positive power line, to a communication interface of one of the plurality of power modules.

10. The apparatus of claim 1, wherein each of the plurality of network devices is re-attachable to multiple locations on the serial string.

11. The apparatus of claim 1, wherein each of the first parameter and the second parameter indicates at least one of: voltage, current, power, temperature, coulombic charge, or solar irradiance.

12. The apparatus of claim 1, wherein the signal is sent via the at least one DC power line of the plurality of DC power lines further by at least one of: an electromagnetic coupling, a capacitive coupling, or a direct coupling.

13. The apparatus of claim 1, wherein the signal is sent via the at least one DC power line of the plurality of DC power lines by a variable capacitance configurable to correct inductive reactance of the at least one DC power line of the plurality of DC power lines.

14. The apparatus of claim 13, wherein the variable capacitance is at least one of a varicap diode or a switched capacitor circuit.

15. The apparatus of claim 1, wherein the signal is sent via the at least one DC power line of the plurality of DC power lines by a filter configurable to allow a bandwidth of the signal to be sent via the at least one DC power line of the plurality of DC power lines.

16. The apparatus of claim 1, wherein the apparatus is mounted inside a power device or a power module.

17. The apparatus of claim 1, wherein each of the plurality of network devices further comprises one or more elliptical apertures configured to insert one or more connection wires therethrough.

18. The apparatus of claim 17, wherein the one or more connection wires are coupled to a communication interface of one of a power device, a power module of the plurality of power modules, or the central controller, wherein the communication interface is located within a connection box or in proximity to the connection box.

19. The apparatus of claim 17, wherein the one or more connection wires are configured to provide power to the plurality of network devices.

20. The apparatus of claim 1, wherein the plurality of safety circuits comprises:
a first safety circuit, wherein the first safety circuit is connected to the positive power line of the plurality of DC power lines of the serial string; and
a second safety circuit, wherein the second safety circuit is connected to the negative power line of the plurality of DC power lines of the serial string.

* * * * *